(12) United States Patent
Mueller et al.

(10) Patent No.: US 9,746,054 B2
(45) Date of Patent: Aug. 29, 2017

(54) MULTI-SPEED TRANSMISSION

(71) Applicant: Allison Transmission, Inc., Indianapolis, IN (US)

(72) Inventors: Joerg Mueller, Chemnitz (DE); Rico Resch, Chemnitz (DE); Mirko Leesch, Gelenau (DE)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

(21) Appl. No.: 15/258,314

(22) Filed: Sep. 7, 2016

(65) Prior Publication Data

US 2017/0067544 A1    Mar. 9, 2017

Related U.S. Application Data

(60) Provisional application No. 62/216,036, filed on Sep. 9, 2015.

(51) Int. Cl.
*F16H 3/66* (2006.01)
*F16H 3/44* (2006.01)

(52) U.S. Cl.
CPC ......... *F16H 3/66* (2013.01); *F16H 2003/445* (2013.01); *F16H 2200/0069* (2013.01); *F16H 2200/0078* (2013.01); *F16H 2200/0086* (2013.01); *F16H 2200/2012* (2013.01); *F16H 2200/2046* (2013.01)

(58) Field of Classification Search
None
See application file for complete search history.

(56) References Cited

U.S. PATENT DOCUMENTS

| | | |
|---|---|---|
| 6,176,803 B1 | 1/2001 | Meyer et al. |
| 6,910,985 B2 | 6/2005 | Ishimaru et al. |
| 6,955,627 B2 | 10/2005 | Thomas et al. |
| 6,984,187 B2 | 1/2006 | Biermann |
| 7,101,305 B2 | 9/2006 | Tabata et al. |
| 7,226,381 B2 | 6/2007 | Klemen |
| 7,429,230 B2 | 9/2008 | Ziemer |
| 7,549,942 B2 | 6/2009 | Gumpoltsberger |
| 7,556,528 B1 | 7/2009 | Ju |
| 7,556,582 B2 | 7/2009 | Gumpoltsberger |
| 7,566,283 B2 | 7/2009 | Gumpoltsberger |
| 7,575,533 B2 | 8/2009 | Gumpoltsberger |
| 7,632,206 B2 | 12/2009 | Gumpoltsberger |
| 7,651,431 B2 | 1/2010 | Phillips et al. |
| 7,674,200 B2 | 3/2010 | Shim |

(Continued)

*Primary Examiner* — Justin Holmes
(74) *Attorney, Agent, or Firm* — Taft Stettinias & Hollister LLP; Stephen F. Rost

(57) ABSTRACT

The present disclosure provides a multiple speed transmission having an input member, an output member, a plurality of planetary gearsets, a plurality of interconnecting members and a plurality of torque-transmitting mechanisms. Each of the plurality of planetary gearsets includes a sun gear, a ring gear, and a carrier member with pinion gears. The input member is selectively interconnected with at least one member of one of the plurality of planetary gear sets, and the output member is continuously interconnected with another member of one of the plurality of planetary gear sets. At least ten forward speeds and one reverse speed are achieved by the selective engagement of the plurality of torque-transmitting mechanisms.

20 Claims, 12 Drawing Sheets

(56) References Cited

U.S. PATENT DOCUMENTS

| | | |
|---|---|---|
| 7,686,730 B2 | 3/2010 | Baldwin |
| 7,691,022 B2 | 4/2010 | Phillips et al. |
| 7,691,024 B2 | 4/2010 | Phillips et al. |
| 7,695,398 B2 | 4/2010 | Phillips et al. |
| 7,704,181 B2 | 4/2010 | Phillips et al. |
| 7,722,496 B2 | 5/2010 | Phillips et al. |
| 7,727,104 B2 | 6/2010 | Shim |
| 7,731,625 B2 | 6/2010 | Phillips et al. |
| 7,736,263 B2 | 6/2010 | Phillips et al. |
| 7,753,820 B2 | 7/2010 | Phillips et al. |
| 7,771,306 B2 | 8/2010 | Phillips et al. |
| 7,828,690 B2 | 11/2010 | Wittkopp et al. |
| 7,841,960 B2 | 11/2010 | Baldwin |
| 7,846,057 B2 | 12/2010 | Shim |
| 7,846,058 B2 | 12/2010 | Kim |
| 7,850,568 B2 | 12/2010 | Shim |
| 7,850,569 B2 | 12/2010 | Seo et al. |
| 7,887,454 B2 | 2/2011 | Phillips et al. |
| 7,909,729 B2 | 3/2011 | Tanaka et al. |
| 7,914,414 B2 | 3/2011 | Phillips et al. |
| 7,946,948 B2 | 5/2011 | Phillips et al. |
| 7,980,988 B2 | 7/2011 | Phillips et al. |
| 7,985,159 B2 | 7/2011 | Phillips et al. |
| 7,988,586 B2 | 8/2011 | Phillips et al. |
| 7,993,235 B2 | 8/2011 | Wittkopp et al. |
| 7,993,237 B2 | 8/2011 | Wittkopp et al. |
| 7,993,238 B2 | 8/2011 | Phillips et al. |
| 7,998,013 B2 | 8/2011 | Phillips et al. |
| 8,001,662 B1 | 8/2011 | Guber |
| 8,002,662 B2 | 8/2011 | Phillips et al. |
| 8,007,394 B2 | 8/2011 | Phillips et al. |
| 8,007,395 B2 | 8/2011 | Wittkopp et al. |
| 8,007,398 B2 | 8/2011 | Phillips et al. |
| 8,016,713 B2 | 9/2011 | Phillips et al. |
| 8,033,948 B2 | 10/2011 | Phillips et al. |
| 8,038,565 B2 | 10/2011 | Phillips et al. |
| 8,038,566 B2 | 10/2011 | Phillips et al. |
| 8,043,189 B2 | 10/2011 | Phillips et al. |
| 8,043,192 B2 | 10/2011 | Phillips et al. |
| 8,047,950 B2 | 11/2011 | Wittkopp et al. |
| 8,047,951 B2 | 11/2011 | Wittkopp et al. |
| 8,047,954 B2 | 11/2011 | Phillips et al. |
| 8,052,566 B2 | 11/2011 | Wittkopp et al. |
| 8,052,567 B2 | 11/2011 | Hart et al. |
| 8,057,349 B2 | 11/2011 | Phillips et al. |
| 8,070,646 B2 | 12/2011 | Hart et al. |
| 8,079,932 B2 | 12/2011 | Phillips et al. |
| 8,088,032 B2 | 1/2012 | Gumpoltsberger et al. |
| 8,096,915 B2 | 1/2012 | Wittkopp et al. |
| 8,100,808 B2 | 1/2012 | Wittkopp et al. |
| 8,105,198 B2 | 1/2012 | Hart et al. |
| 8,128,527 B2 | 3/2012 | Hart et al. |
| 8,142,324 B2 | 3/2012 | Phillips et al. |
| 8,142,325 B2 | 3/2012 | Phillips et al. |
| 8,152,681 B2 | 4/2012 | Seo et al. |
| 8,157,697 B2 | 4/2012 | Hart et al. |
| 8,167,765 B2 | 5/2012 | Phillips et al. |
| 8,167,766 B2 | 5/2012 | Phillips et al. |
| 8,187,130 B1 | 5/2012 | Mellet et al. |
| 8,187,137 B2 | 5/2012 | Carey et al. |
| 8,197,376 B2 | 6/2012 | Gumpoltsberger et al. |
| 8,202,190 B2 | 6/2012 | Phillips et al. |
| 8,206,257 B2 | 6/2012 | Gumpoltsberger et al. |
| 8,210,981 B2 | 7/2012 | Bauknecht et al. |
| 8,210,982 B2 | 7/2012 | Gumpoltsberger et al. |
| 8,210,983 B2 | 7/2012 | Gumpoltsberger et al. |
| 8,231,495 B2 | 7/2012 | Gumpoltsberger et al. |
| 8,231,496 B2 | 7/2012 | Gumpoltsberger et al. |
| 8,231,501 B2 | 7/2012 | Gumpoltsberger et al. |
| 8,241,170 B2 | 8/2012 | Gumpoltsberger et al. |
| 8,241,171 B2 | 8/2012 | Gumpoltsberger et al. |
| 8,246,504 B2 | 8/2012 | Gumpoltsberger et al. |
| 8,251,856 B2 | 8/2012 | Phillips et al. |
| 8,251,857 B1 | 8/2012 | Mellet et al. |
| 8,251,859 B2 | 8/2012 | Gumpoltsberger et al. |
| 8,277,355 B2 | 10/2012 | Hart et al. |
| 8,287,420 B2 | 10/2012 | Gumpoltsberger et al. |
| 8,303,453 B2 | 11/2012 | Wittkopp et al. |
| 8,303,455 B2 | 11/2012 | Gumpoltsberger et al. |
| 8,303,456 B2 | 11/2012 | Kim |
| 8,328,678 B2 | 12/2012 | Seo et al. |
| 8,328,679 B2 | 12/2012 | Jang et al. |
| 8,333,676 B2 | 12/2012 | Kim |
| 8,343,005 B2 | 1/2013 | Hart et al. |
| 8,366,580 B2 | 2/2013 | Wittkopp et al. |
| 8,371,982 B2 | 2/2013 | Lee et al. |
| 8,376,893 B2 | 2/2013 | Wittkopp et al. |
| 8,376,895 B2 | 2/2013 | Saitoh et al. |
| 8,382,634 B2 | 2/2013 | Beck et al. |
| 8,398,522 B2 | 3/2013 | Bauknecht et al. |
| 8,403,803 B2 | 3/2013 | Gumpoltsberger et al. |
| 8,409,047 B2 | 4/2013 | Borgerson et al. |
| 8,414,445 B2 | 4/2013 | Carey et al. |
| 8,414,446 B2 | 4/2013 | Beck et al. |
| 8,419,587 B2 | 4/2013 | Gumpoltsberger et al. |
| 8,425,367 B2 | 4/2013 | Phillips et al. |
| 8,425,368 B2 | 4/2013 | Phillips et al. |
| 8,425,369 B2 | 4/2013 | Wittkopp et al. |
| 8,425,370 B2 | 4/2013 | Leesch et al. |
| 8,430,784 B2 | 4/2013 | Hart et al. |
| 8,430,785 B2 | 4/2013 | Beck et al. |
| 8,435,153 B2 | 5/2013 | Phillips et al. |
| 8,444,524 B2 | 5/2013 | Gumpoltsberger et al. |
| 8,444,525 B2 | 5/2013 | Gumpoltsberger et al. |
| 8,460,151 B2 | 6/2013 | Wittkopp et al. |
| 8,465,390 B2 | 6/2013 | Brehmer et al. |
| 8,480,533 B2 | 7/2013 | Meyer et al. |
| 8,485,934 B2 | 7/2013 | Gumpoltsberger et al. |
| 8,496,558 B2 | 7/2013 | Wittkopp et al. |
| 8,506,442 B2 | 8/2013 | Mellet et al. |
| 8,512,196 B2 | 8/2013 | Mellet et al. |
| 8,523,729 B2 | 9/2013 | Hart et al. |
| 8,529,394 B2 | 9/2013 | Gumpoltsberger et al. |
| 8,529,395 B2 | 9/2013 | Wittkopp et al. |
| 8,529,396 B1 | 9/2013 | Vernon et al. |
| 8,545,362 B1 | 10/2013 | Goleski et al. |
| 8,556,766 B2 | 10/2013 | Mellet et al. |
| 8,556,768 B2 | 10/2013 | Park et al. |
| 8,574,113 B1 | 11/2013 | Goleski |
| 8,574,114 B2 | 11/2013 | Brehmer et al. |
| 8,591,364 B2 | 11/2013 | Hart |
| 8,591,377 B1 | 11/2013 | Hoffman et al. |
| 8,597,152 B2 | 12/2013 | Seo et al. |
| 8,597,153 B2 | 12/2013 | Saitoh et al. |
| 8,602,934 B2 | 12/2013 | Mellet et al. |
| 8,608,612 B2 | 12/2013 | Park et al. |
| 8,617,022 B1 | 12/2013 | Vernon et al. |
| 8,636,617 B2 | 1/2014 | Singh |
| 8,636,618 B2 | 1/2014 | Hart et al. |
| 8,647,227 B2 | 2/2014 | Park et al. |
| 8,663,053 B2 | 3/2014 | Beck et al. |
| 8,663,056 B2 | 3/2014 | Gumpoltsberger et al. |
| 8,678,972 B2 | 3/2014 | Wittkopp et al. |
| 8,702,554 B2 | 4/2014 | Gumpoltsberger et al. |
| 8,702,555 B1 | 4/2014 | Hart et al. |
| 8,708,862 B2 | 4/2014 | Scherer et al. |
| 8,721,488 B2 | 5/2014 | Mellet et al. |
| 8,721,492 B2 | 5/2014 | Fellmann et al. |
| 8,727,929 B2 | 5/2014 | Beck et al. |
| 8,734,285 B2 | 5/2014 | Wilton et al. |
| 8,734,286 B2 | 5/2014 | Coffey et al. |
| 8,758,187 B2 | 6/2014 | Mellet et al. |
| 8,758,189 B2 | 6/2014 | Hart et al. |
| 8,777,797 B2 | 7/2014 | Mellet et al. |
| 8,777,798 B2 | 7/2014 | Borgerson et al. |
| 8,801,563 B2 | 8/2014 | Ohnemus et al. |
| 8,801,565 B2 | 8/2014 | Hart et al. |
| 8,821,336 B2 | 9/2014 | Wilton et al. |
| 8,858,387 B2 | 10/2014 | Haupt et al. |
| 8,864,618 B1 | 10/2014 | Noh et al. |
| 8,888,648 B2 | 11/2014 | Mellet et al. |
| 8,894,535 B2 | 11/2014 | Mellet et al. |
| 8,915,819 B2 | 12/2014 | Coffey et al. |
| 8,920,281 B2 | 12/2014 | Mellet et al. |

(56) References Cited

U.S. PATENT DOCUMENTS

| | | |
|---|---|---|
| 8,939,863 B2 | 1/2015 | Hart et al. |
| 8,951,160 B2 | 2/2015 | Vernon et al. |
| 8,961,355 B2 | 2/2015 | Hart et al. |
| 8,961,356 B2 | 2/2015 | Bockenstette et al. |
| 8,968,142 B2 | 3/2015 | Lippert |
| 8,968,144 B2 | 3/2015 | Janson et al. |
| 2006/0205556 A1 | 9/2006 | Klemen |
| 2006/0223666 A1 | 10/2006 | Gumpoltsberger |
| 2007/0207891 A1 | 9/2007 | Gumpoltsberger |
| 2007/0213168 A1 | 9/2007 | Gumpoltsberger |
| 2008/0070740 A1 | 3/2008 | Gumpoltsberger |
| 2008/0125269 A1 | 5/2008 | Gumpoltsberger |
| 2008/0300092 A1 | 12/2008 | Phillips et al. |
| 2009/0011891 A1 | 1/2009 | Phillips et al. |
| 2009/0017964 A1 | 1/2009 | Phillips et al. |
| 2009/0017965 A1 | 1/2009 | Phillips et al. |
| 2009/0017966 A1 | 1/2009 | Phillips et al. |
| 2009/0017971 A1 | 1/2009 | Phillips et al. |
| 2009/0017976 A1 | 1/2009 | Phillips et al. |
| 2009/0017977 A1 | 1/2009 | Phillips et al. |
| 2009/0017979 A1 | 1/2009 | Phillips et al. |
| 2009/0017980 A1 | 1/2009 | Phillips et al. |
| 2009/0036253 A1 | 2/2009 | Phillips et al. |
| 2009/0048059 A1 | 2/2009 | Phillips et al. |
| 2009/0048062 A1 | 2/2009 | Seo et al. |
| 2009/0054196 A1 | 2/2009 | Phillips et al. |
| 2009/0118059 A1 | 5/2009 | Phillips et al. |
| 2009/0118062 A1 | 5/2009 | Phillips et al. |
| 2009/0124448 A1 | 5/2009 | Wittkopp et al. |
| 2009/0192009 A1 | 7/2009 | Phillips et al. |
| 2009/0192010 A1 | 7/2009 | Wittkopp et al. |
| 2009/0192011 A1 | 7/2009 | Wittkopp et al. |
| 2009/0192012 A1 | 7/2009 | Phillips et al. |
| 2009/0197733 A1 | 8/2009 | Phillips et al. |
| 2009/0197734 A1 | 8/2009 | Phillips et al. |
| 2009/0209387 A1 | 8/2009 | Phillips et al. |
| 2009/0209389 A1 | 8/2009 | Phillips et al. |
| 2009/0215580 A1 | 8/2009 | Hart et al. |
| 2009/0280947 A1 | 11/2009 | Seo et al. |
| 2010/0041508 A1 | 2/2010 | Gumpoltsberger et al. |
| 2010/0041509 A1 | 2/2010 | Gumpoltsberger et al. |
| 2010/0069195 A1 | 3/2010 | Baldwin |
| 2010/0190600 A1 | 7/2010 | Phillips et al. |
| 2010/0210392 A1 | 8/2010 | Hart et al. |
| 2010/0210393 A1 | 8/2010 | Phillips et al. |
| 2010/0210394 A1 | 8/2010 | Phillips et al. |
| 2010/0210395 A1 | 8/2010 | Phillips et al. |
| 2010/0210396 A1 | 8/2010 | Wittkopp et al. |
| 2010/0210397 A1 | 8/2010 | Wittkopp et al. |
| 2010/0210398 A1 | 8/2010 | Hart et al. |
| 2010/0210400 A1 | 8/2010 | Phillips et al. |
| 2010/0210401 A1 | 8/2010 | Phillips et al. |
| 2010/0210402 A1 | 8/2010 | Phillips et al. |
| 2010/0210403 A1 | 8/2010 | Wittkopp et al. |
| 2010/0210404 A1 | 8/2010 | Phillips et al. |
| 2010/0210405 A1 | 8/2010 | Phillips et al. |
| 2010/0210406 A1 | 8/2010 | Phillips et al. |
| 2010/0216589 A1 | 8/2010 | Hart et al. |
| 2010/0216590 A1 | 8/2010 | Phillips et al. |
| 2010/0216591 A1 | 8/2010 | Wittkopp et al. |
| 2010/0227729 A1 | 9/2010 | Wittkopp et al. |
| 2010/0279814 A1 | 11/2010 | Brehmer et al. |
| 2010/0331136 A1 | 12/2010 | Jang et al. |
| 2011/0009229 A1 | 1/2011 | Bauknecht et al. |
| 2011/0045936 A1 | 2/2011 | Gumpoltsberger et al. |
| 2011/0045937 A1 | 2/2011 | Gumpoltsberger et al. |
| 2011/0045938 A1 | 2/2011 | Gumpoltsberger et al. |
| 2011/0045939 A1 | 2/2011 | Gumpoltsberger et al. |
| 2011/0045940 A1 | 2/2011 | Gumpoltsberger et al. |
| 2011/0045942 A1 | 2/2011 | Gumpoltsberger et al. |
| 2011/0045943 A1 | 2/2011 | Gumpoltsberger et al. |
| 2011/0124462 A1 | 5/2011 | Meyer et al. |
| 2011/0136615 A1 | 6/2011 | Phillips et al. |
| 2011/0183607 A1 | 7/2011 | Budianu et al. |
| 2011/0212806 A1 | 9/2011 | Phillips et al. |
| 2011/0245013 A1 | 10/2011 | Kim |
| 2011/0245026 A1 | 10/2011 | Phillips et al. |
| 2011/0251014 A1 | 10/2011 | Leesch et al. |
| 2011/0275472 A1 | 11/2011 | Phillips et al. |
| 2011/0294617 A1 | 12/2011 | Seo et al. |
| 2012/0004066 A1 | 1/2012 | Seo et al. |
| 2012/0053004 A1 | 3/2012 | Beck et al. |
| 2012/0053005 A1 | 3/2012 | Beck et al. |
| 2012/0053007 A1 | 3/2012 | Wittkopp et al. |
| 2012/0058856 A1 | 3/2012 | Phillips et al. |
| 2012/0065019 A1 | 3/2012 | Hart et al. |
| 2012/0108382 A1 | 5/2012 | Saitoh et al. |
| 2012/0108383 A1 | 5/2012 | Saitoh et al. |
| 2012/0115671 A1 | 5/2012 | Gumpoltsberger et al. |
| 2012/0115672 A1 | 5/2012 | Gumpoltsberger et al. |
| 2012/0122626 A1 | 5/2012 | Gumpoltsberger et al. |
| 2012/0122627 A1 | 5/2012 | Gumpoltsberger et al. |
| 2012/0135834 A1 | 5/2012 | Gumpoltsberger et al. |
| 2012/0135835 A1 | 5/2012 | Gumpoltsberger et al. |
| 2012/0149525 A1 | 6/2012 | Gumpoltsberger et al. |
| 2012/0149526 A1 | 6/2012 | Gumpoltsberger et al. |
| 2012/0149527 A1 | 6/2012 | Gumpoltsberger et al. |
| 2012/0172172 A1 | 7/2012 | Gumpoltsberger et al. |
| 2012/0178564 A1 | 7/2012 | Vahabzadeh et al. |
| 2012/0178572 A1 | 7/2012 | Hart et al. |
| 2012/0178579 A1 | 7/2012 | Hart et al. |
| 2012/0178580 A1 | 7/2012 | Wittkopp et al. |
| 2012/0178581 A1 | 7/2012 | Wittkopp et al. |
| 2012/0178582 A1 | 7/2012 | Wittkopp et al. |
| 2012/0196718 A1 | 8/2012 | Hart et al. |
| 2012/0214632 A1 | 8/2012 | Mellet et al. |
| 2012/0214633 A1 | 8/2012 | Mellet et al. |
| 2012/0214636 A1 | 8/2012 | Hart et al. |
| 2012/0214637 A1 | 8/2012 | Hart et al. |
| 2012/0214638 A1 | 8/2012 | Hart et al. |
| 2012/0231917 A1 | 9/2012 | Phillips et al. |
| 2012/0231920 A1 | 9/2012 | Wittkopp et al. |
| 2012/0295754 A1 | 11/2012 | Hart et al. |
| 2012/0329600 A1 | 12/2012 | Park et al. |
| 2013/0029799 A1 | 1/2013 | Park et al. |
| 2013/0040776 A1 | 2/2013 | Mellet et al. |
| 2013/0085031 A1 | 4/2013 | Bassi et al. |
| 2013/0085032 A1* | 4/2013 | Mellet .............. F16H 3/66 475/275 |
| 2013/0085033 A1 | 4/2013 | Wittkopp et al. |
| 2013/0150203 A1 | 6/2013 | Park et al. |
| 2013/0150204 A1 | 6/2013 | Park et al. |
| 2013/0187796 A1 | 7/2013 | Kim et al. |
| 2013/0203549 A1 | 8/2013 | Mellet et al. |
| 2013/0237365 A1 | 9/2013 | Coffey et al. |
| 2013/0252780 A1 | 9/2013 | Ohnemus et al. |
| 2013/0310211 A1 | 11/2013 | Wilton et al. |
| 2016/0356345 A1* | 12/2016 | Ji .................. F16H 3/66 |
| 2016/0363188 A1* | 12/2016 | Kook .............. F16H 3/66 |
| 2017/0074363 A1* | 3/2017 | Park ............... F16H 3/66 |
| 2017/0074368 A1* | 3/2017 | Park ............... F16H 3/66 |
| 2017/0074370 A1* | 3/2017 | Kwon ............. F16H 3/66 |

\* cited by examiner

| Range | C1 | C2 | C3 | C4 | C5 | C6 |
|---|---|---|---|---|---|---|
| 1 |  | X | X |  | X |  |
| 2 | X |  | X |  | X |  |
| 3 | X | X |  |  | X |  |
| 4 | X |  |  |  | X | X |
| 5 | X | X |  | X | X |  |
| 6 |  | X |  | X | X |  |
| 7 |  |  |  | X | X | X |
| 8 | X | X |  | X |  | X |
| 9 | X |  |  | X |  | X |
| 10 | X |  |  |  |  |  |
| R1 |  | X | X |  |  | X |
| R2 |  | X | X |  |  | X |
| Hill Hold | X |  | X |  |  |  |

Fig. 3

| Range | C1 | C2 | C3 | C4 | C5 | C6 |
|---|---|---|---|---|---|---|
| 1 |  | x | x |  | x |  |
| 2 | x | x |  |  | x |  |
| 3 |  | x |  |  | x | x |
| 4 | x |  |  |  | x | x |
| 5 |  |  | x |  | x | x |
| 6 |  |  |  | x | x | x |
| 7 |  |  | x | x | x |  |
| 8 | x |  |  | x | x |  |
| 9 | x |  | x | x |  |  |
| 10 |  |  |  |  |  | x |
| R1 |  | x | x |  |  | x |

| Range | C1 | C2 | C3 | C4 | C5 | C6 |
|---|---|---|---|---|---|---|
| 1 | X | X | | X | | |
| 2 | X | | | X | X | |
| 3 | | X | | X | X | |
| 4 | | X | | X | | X |
| 5 | | | | X | X | X |
| 6 | | | X | X | | X |
| 7 | | | X | X | X | |
| 8 | | X | X | | X | X |
| 9 | | X | X | | X | |
| 10 | | | X | | X | X |
| R1 | X | | X | X | | |
| Hill Hold | X | X | | | | X |

Fig. 7

| Range | C1 | C2 | C3 | C4 | C5 | C6 |
|-------|----|----|----|----|----|----|
| 1 | X | X | X |  | X |  |
| 2 |  | X |  |  | X |  |
| 3 | X | X |  |  | X | X |
| 4 |  |  |  |  | X | X |
| 5 |  |  | X |  | X | X |
| 6 |  |  |  | X | X | X |
| 7 |  |  | X | X | X |  |
| 8 | X |  |  | X | X |  |
| 9 |  |  | X | X |  | X |
| 10 | X |  |  | X |  | X |
| R1 |  | X | X | X |  | X |

| Range | C1 | C2 | C3 | C4 | C5 | C6 |
|---|---|---|---|---|---|---|
| 1 | X | X | | | | X |
| 2 | X | X | X | | | |
| 3 | X | X | | | X | |
| 4 | X | | X | | X | |
| 5 | X | | | | X | X |
| 6 | | X | X | | X | X |
| 7 | | X | X | | X | X |
| 8 | | X | X | X | | X |
| 9 | X | | | X | | |
| 10 | X | | X | X | | X |
| R1 | X | | | X | | X |
| R2 | X | X | | | | |
| Hill Hold | X | X | | | | |

Fig. 11

| Range | Gear Ratio | C1 | C2 | C3 | C4 | C5 | C6 |
|---|---|---|---|---|---|---|---|
| 1 | 4.68 | X | X | | X | | |
| 2 | 2.91 | X | | | X | X | |
| 3 | 2.16 | X | | | X | | X |
| 4 | 2.05 | | X | | X | | |
| 5 | 1.67 | | X | | X | X | X |
| 6 | 1.63 | X | X | X | | | |
| 7 | 1.40 | | | X | X | X | X |
| 8 | 1.16 | | | X | X | X | X |
| 9 | 1.00 | | X | X | | X | |
| 10 | 0.89 | | X | X | | X | X |
| 11 | 0.71 | | | X | | X | |
| 12 | 0.58 | X | | X | X | X | X |
| 13 | 0.48 | X | | X | | | |
| R1 | -3.98 | X | X | X | | | |
| Hill Hold | | | | | | | X | ary gearset and the third member of the fourth planetary
MULTI-SPEED TRANSMISSION

RELATED APPLICATIONS

The present application claims the benefit of and priority to U.S. Provisional Patent Application Ser. No. 62/216,036, filed Sep. 9, 2015, the disclosure of which is hereby incorporated by reference in its entirety.

FIELD OF THE DISCLOSURE

The present disclosure relates to a multiple speed transmission, and in particular to a multiple speed transmission capable of achieving ten or more speeds.

BACKGROUND

Multiple speed transmission use a number of friction clutches or brakes, planetary gearsets, shafts, and other elements to achieve a plurality of gear or speed ratios. The architecture, i.e., packaging or layout of the aforementioned elements, is determined based on cost, size, packaging constraints, and desired ratios. There is a need for new architectural designs of multiple speed transmissions for achieving different ratios with improved performance, cost, efficiency, responsiveness, and packaging.

SUMMARY

In a first embodiment of the present disclosure, a multiple speed transmission includes an input member; an output member; first, second, third and fourth planetary gearsets each having first, second and third members; a plurality of interconnecting members each connected to at least one of the first, second, third, and fourth planetary gearsets; a first torque-transmitting mechanism selectively engageable to interconnect the second member of the third planetary gearset with a stationary member; a second torque-transmitting mechanism selectively engageable to interconnect the third member of the first planetary gearset and the first member of the third planetary gearset with the stationary member; a third torque-transmitting mechanism selectively engageable to interconnect the second member of the second planetary gearset with the input member; a fourth torque-transmitting mechanism selectively engageable to interconnect the first member of the second planetary gearset and the first member of the fourth planetary gearset with the input member; a fifth torque-transmitting mechanism selectively engageable to interconnect the second member of the second planetary gearset with the third member of the third planetary gearset and the third member of the fourth planetary gearset; a sixth torque-transmitting mechanism selectively engageable to interconnect the second member of the second planetary gearset with the second member of the third planetary gearset; wherein the torque transmitting mechanisms are selectively engageable in combinations of at least three to establish at least ten forward speed ratios and at least one reverse speed ratio between the input member and the output member.

In one example of this embodiment, the input member is not continuously interconnected with any member of the first, second, third, or fourth planetary gearset, and the output member is continuously interconnected with the second member of the fourth planetary gearset. In another example, the plurality of interconnecting members includes a first interconnecting member directly connecting the first member of the first planetary gearset with the stationary member. In a third example, the plurality of interconnecting members includes a second interconnecting member continuously interconnecting the second member of the first planetary gearset with the third member of the second planetary gearset. In a fourth example, the plurality of interconnecting members includes a third interconnecting member continuously interconnecting the third member of the first planetary gearset with the first member of the third planetary gearset.

In a fifth example, the plurality of interconnecting members includes a fourth interconnecting member continuously connected to the second member of the second planetary gearset. In a sixth example, the plurality of interconnecting members includes a fifth interconnecting member continuously interconnecting the first member of the second planetary gearset with the first member of the fourth planetary gearset. In a seventh example, the plurality of interconnecting members includes a sixth interconnecting member continuously interconnecting the third member of the third planetary gearset with the third member of the fourth planetary gearset. In an eighth example, the plurality of interconnecting members includes a seventh interconnecting member continuously connected to the second member of the third planetary gearset. In a ninth example, the torque transmitting mechanisms are selectively engageable in combinations of at least three to establish at least ten forward speed ratios and one reverse ratio between the input member and the output member.

In a tenth example of this embodiment, the torque transmitting mechanisms are selectively engageable in combinations of at least three to establish at least thirteen forward speed ratios and one reverse ratio between the input member and the output member. In a further example, when shifting from at least one forward speed ratio into one of a successive higher and a successive lower forward speed ratio causes at least two of the first, the second, the third, the fourth, the fifth and the sixth torque transmitting mechanisms to disengage and at least two of the first, the second, the third, the fourth, the fifth, and the sixth torque transmitting mechanisms to engage. In yet another example, when shifting from one forward speed ratio into one of a successive higher and a successive lower forward speed ratio causes at least one of the first, the second, the third, the fourth, the fifth and the sixth torque transmitting mechanisms to disengage and at least one of the first, the second, the third, the fourth, the fifth, and the sixth torque transmitting mechanisms to engage. In a different example, a hill hold condition is achieved when the first, second and sixth torque-transmitting mechanisms are selectively engaged.

In another embodiment of this disclosure, a multiple speed transmission includes an input member; an output member; first, second, third and fourth planetary gearsets each having a sun gear, a carrier member, and a ring gear; a plurality of interconnecting members each connected to at least one of the first, second, third, and fourth planetary gearsets; a first torque-transmitting mechanism selectively engageable to interconnect the carrier member of the third planetary gearset with a stationary member; a second torque-transmitting mechanism selectively engageable to interconnect the ring gear of the first planetary gearset and the sun gear of the third planetary gearset with the stationary member; a third torque-transmitting mechanism selectively engageable to interconnect the carrier member of the second planetary gearset with the input member; a fourth torque-transmitting mechanism selectively engageable to interconnect the sun gear of the second planetary gearset and the sun gear of the fourth planetary gearset with the input member;

a fifth torque-transmitting mechanism selectively engageable to interconnect the carrier member of the second planetary gearset with the ring gear of the third planetary gearset and the ring gear of the fourth planetary gearset; a sixth torque-transmitting mechanism selectively engageable to interconnect the carrier member of the second planetary gearset with the carrier member of the third planetary gearset; wherein the torque transmitting mechanisms are selectively engageable in combinations of at least three to establish at least ten forward speed ratios and at least one reverse speed ratio between the input member and the output member.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 3 is a truth table presenting an example of a state of engagement of various torque transmitting mechanisms in each of the available forward and reverse speeds or gear ratios of the transmissions illustrated in FIG. 2;

FIG. 5 is a truth table presenting an example of a state of engagement of various torque transmitting mechanisms in each of the available forward and reverse speeds or gear ratios of the transmissions illustrated in FIG. 4;

FIG. 7 is a truth table presenting an example of a state of engagement of various torque transmitting mechanisms in each of the available forward and reverse speeds or gear ratios of the transmissions illustrated in FIG. 6;

FIG. 9 is a truth table presenting an example of a state of engagement of various torque transmitting mechanisms in each of the available forward and reverse speeds or gear ratios of the transmissions illustrated in FIG. 8;

FIG. 11 is a truth table presenting an example of a state of engagement of various torque transmitting mechanisms in each of the available forward and reverse speeds or gear ratios of the transmissions illustrated in FIG. 10.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
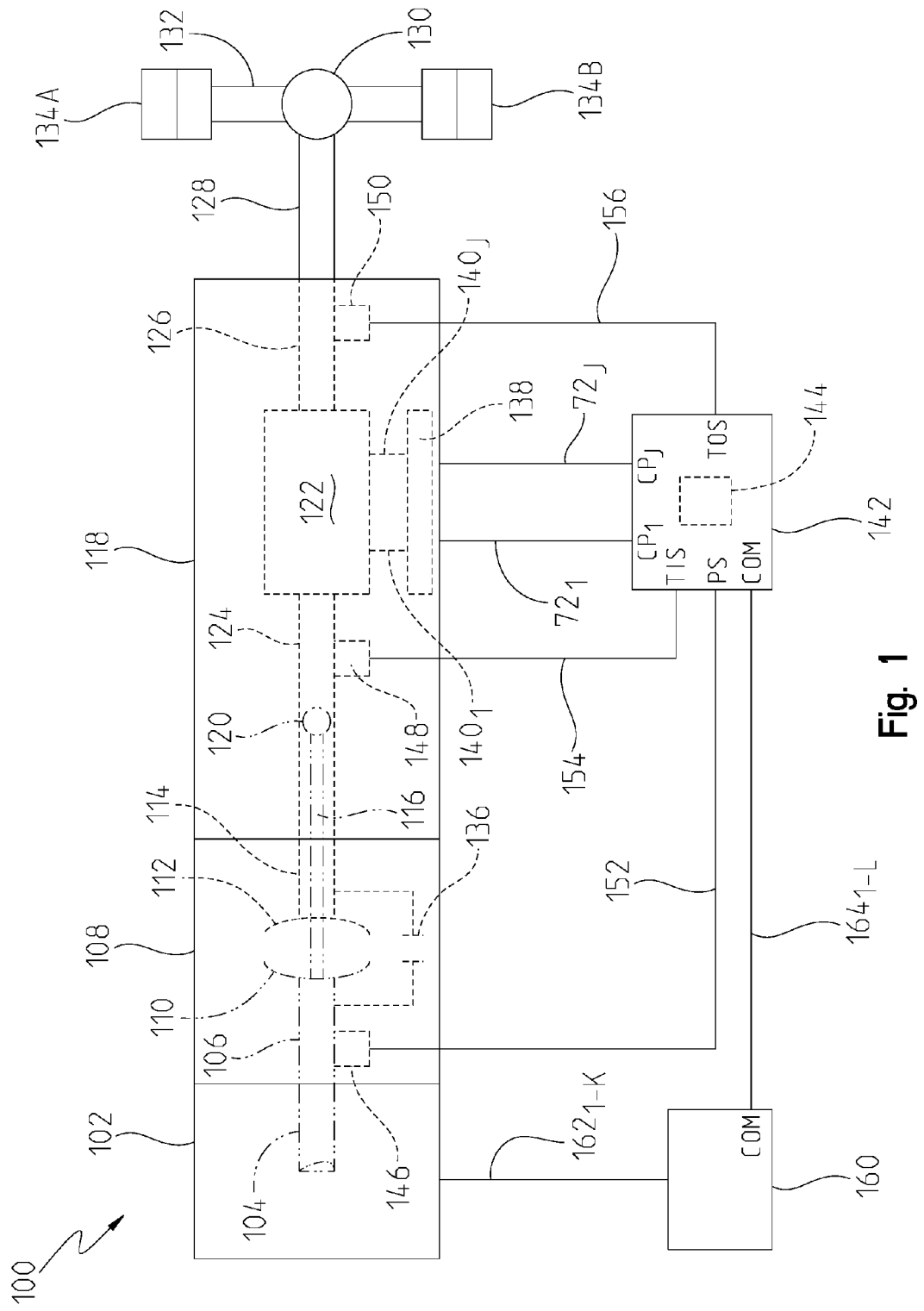
FIG. 1 is an exemplary block diagram and schematic view of one illustrative embodiment of a powered vehicular system.

Referring now to FIG. 1, a block diagram and schematic view of one illustrative embodiment of a vehicular system 100 having a drive unit 102 and transmission 118 is shown. In the illustrated embodiment, the drive unit 102 may include an internal combustion engine, diesel engine, electric motor, or other power-generating device. The drive unit 102 is configured to rotatably drive an output shaft 104 that is coupled to an input or pump shaft 106 of a conventional torque converter 108. The input or pump shaft 106 is coupled to an impeller or pump 110 that is rotatably driven by the output shaft 104 of the drive unit 102. The torque converter 108 further includes a turbine 112 that is coupled to a turbine shaft 114, and the turbine shaft 114 is coupled to, or integral with, a rotatable input shaft 124 of the transmission 118. The transmission 118 can also include an internal pump 120 for building pressure within different flow circuits (e.g., main circuit, lube circuit, etc.) of the transmission 118. The pump 120 can be driven by a shaft 116 that is coupled to the output shaft 104 of the drive unit 102. In this arrangement, the drive unit 102 can deliver torque to the shaft 116 for driving the pump 120 and building pressure within the different circuits of the transmission 118.

The transmission 118 can include a planetary gear system 122 having a number of automatically selected gears. An output shaft 126 of the transmission 118 is coupled to or integral with, and rotatably drives, a propeller shaft 128 that is coupled to a conventional universal joint 130. The universal joint 130 is coupled to, and rotatably drives, an axle 132 having wheels 134A and 134B mounted thereto at each end. The output shaft 126 of the transmission 118 drives the wheels 134A and 134B in a conventional manner via the propeller shaft 128, universal joint 130 and axle 132.

A conventional lockup clutch 136 is connected between the pump 110 and the turbine 112 of the torque converter 108. The operation of the torque converter 108 is conventional in that the torque converter 108 is operable in a so-called "torque converter" mode during certain operating conditions such as vehicle launch, low speed and certain gear shifting conditions. In the torque converter mode, the lockup clutch 136 is disengaged and the pump 110 rotates at the rotational speed of the drive unit output shaft 104 while the turbine 112 is rotatably actuated by the pump 110 through a fluid (not shown) interposed between the pump 110 and the turbine 112. In this operational mode, torque multiplication occurs through the fluid coupling such that the turbine shaft 114 is exposed to drive more torque than is being supplied by the drive unit 102, as is known in the art. The torque converter 108 is alternatively operable in a so-called "lockup" mode during other operating conditions, such as when certain gears of the planetary gear system 122 of the transmission 118 are engaged. In the lockup mode, the lockup clutch 136 is engaged and the pump 110 is thereby secured directly to the turbine 112 so that the drive unit output shaft 104 is directly coupled to the input shaft 124 of the transmission 118, as is also known in the art.

The transmission 118 further includes an electro-hydraulic system 138 that is fluidly coupled to the planetary gear system 122 via a number, J, of fluid paths, $140_1$-$140_J$, where J may be any positive integer. The electro-hydraulic system 138 is responsive to control signals to selectively cause fluid to flow through one or more of the fluid paths, $140_1$-$140_J$, to thereby control operation, i.e., engagement and disengagement, of a plurality of corresponding friction devices in the planetary gear system 122. The plurality of friction devices may include, but are not limited to, one or more conventional brake devices, one or more torque transmitting devices, and the like. Generally, the operation, i.e., engagement and disengagement, of the plurality of friction devices is controlled by selectively controlling the friction applied by each of the plurality of friction devices, such as by controlling fluid pressure to each of the friction devices. In one example embodiment, which is not intended to be limiting in any way, the plurality of friction devices include a plurality of brake and torque transmitting devices in the form of conventional clutches that may each be controllably engaged and disengaged via fluid pressure supplied by the electro-hydraulic system 138. In any case, changing or shifting between the various gears of the transmission 118 is accomplished in a conventional manner by selectively controlling the plurality of friction devices via control of fluid pressure within the number of fluid paths $140_1$-$140_J$.

The system 100 further includes a transmission control circuit 142 that can include a memory unit 144. The transmission control circuit 142 is illustratively microprocessor-based, and the memory unit 144 generally includes instructions stored therein that are executable by a processor of the transmission control circuit 142 to control operation of the torque converter 108 and operation of the transmission 118, i.e., shifting between the various gears of the planetary gear system 122. It will be understood, however, that this disclosure contemplates other embodiments in which the transmission control circuit 142 is not microprocessor-based, but is configured to control operation of the torque converter 108 and/or transmission 118 based on one or more sets of hardwired instructions and/or software instructions stored in the memory unit 144.

In the system 100 illustrated in FIG. 1, the torque converter 108 and the transmission 118 include a number of sensors configured to produce sensor signals that are indicative of one or more operating states of the torque converter 108 and transmission 118, respectively. For example, the torque converter 108 illustratively includes a conventional speed sensor 146 that is positioned and configured to produce a speed signal corresponding to the rotational speed of the pump shaft 106, which is the same rotational speed of the output shaft 104 of the drive unit 102. The speed sensor 146 is electrically connected to a pump speed input, PS, of the transmission control circuit 142 via a signal path 152, and the transmission control circuit 142 is operable to process the speed signal produced by the speed sensor 146 in a conventional manner to determine the rotational speed of the pump shaft 106/drive unit output shaft 104.

The transmission 118 illustratively includes another conventional speed sensor 148 that is positioned and configured to produce a speed signal corresponding to the rotational speed of the transmission input shaft 124, which is the same rotational speed as the turbine shaft 114. The input shaft 124 of the transmission 118 is directly coupled to, or integral with, the turbine shaft 114, and the speed sensor 148 may alternatively be positioned and configured to produce a speed signal corresponding to the rotational speed of the turbine shaft 114. In any case, the speed sensor 148 is electrically connected to a transmission input shaft speed input, TIS, of the transmission control circuit 142 via a signal path 154, and the transmission control circuit 142 is operable to process the speed signal produced by the speed sensor 148 in a conventional manner to determine the rotational speed of the turbine shaft 114/transmission input shaft 124.

The transmission 118 further includes yet another speed sensor 150 that is positioned and configured to produce a speed signal corresponding to the rotational speed of the output shaft 126 of the transmission 118. The speed sensor 150 may be conventional, and is electrically connected to a transmission output shaft speed input, TOS, of the transmission control circuit 142 via a signal path 156. The transmission control circuit 142 is configured to process the speed signal produced by the speed sensor 150 in a conventional manner to determine the rotational speed of the transmission output shaft 126.

In the illustrated embodiment, the transmission 118 further includes one or more actuators configured to control various operations within the transmission 118. For example, the electro-hydraulic system 138 described herein illustratively includes a number of actuators, e.g., conventional solenoids or other conventional actuators, that are electrically connected to a number, J, of control outputs, $CP_1$-$CP_J$, of the transmission control circuit 142 via a corresponding number of signal paths $72_1$-$72_J$, where J may be any positive integer as described above. The actuators within the electro-hydraulic system 138 are each responsive to a corresponding one of the control signals, $CP_1$-$CP_J$, produced by the transmission control circuit 142 on one of the corresponding signal paths $72_1$-$72_J$ to control the friction applied by each of the plurality of friction devices by controlling the pressure of fluid within one or more corresponding fluid passageway $140_1$-$140_J$, and thus control the operation, i.e., engaging and disengaging, of one or more corresponding friction devices, based on information provided by the various speed sensors 146, 148, and/or 150.

The friction devices of the planetary gear system 122 are illustratively controlled by hydraulic fluid which is distributed by the electro-hydraulic system in a conventional manner. For example, the electro-hydraulic system 138 illustratively includes a conventional hydraulic positive displacement pump (not shown) which distributes fluid to the one or more friction devices via control of the one or more actuators within the electro-hydraulic system 138. In this embodiment, the control signals, $CP_1$-$CP_J$, are illustratively analog friction device pressure commands to which the one or more actuators are responsive to control the hydraulic pressure to the one or more frictions devices. It will be understood, however, that the friction applied by each of the plurality of friction devices may alternatively be controlled in accordance with other conventional friction device control structures and techniques, and such other conventional friction device control structures and techniques are contemplated by this disclosure. In any case, however, the analog operation of each of the friction devices is controlled by the control circuit 142 in accordance with instructions stored in the memory unit 144.

In the illustrated embodiment, the system 100 further includes a drive unit control circuit 160 having an input/output port (I/O) that is electrically coupled to the drive unit 102 via a number, K, of signal paths 162, wherein K may be any positive integer. The drive unit control circuit 160 may be conventional, and is operable to control and manage the overall operation of the drive unit 102. The drive unit control circuit 160 further includes a communication port, COM, which is electrically connected to a similar communication port, COM, of the transmission control circuit 142 via a number, L, of signal paths 164, wherein L may be any positive integer. The one or more signal paths 164 are typically referred to collectively as a data link. Generally, the drive unit control circuit 160 and the transmission control circuit 142 are operable to share information via the one or more signal paths 164 in a conventional manner. In one embodiment, for example, the drive unit control circuit 160 and transmission control circuit 142 are operable to share information via the one or more signal paths 164 in the form of one or more messages in accordance with a society of automotive engineers (SAE) J-1939 communications protocol, although this disclosure contemplates other embodiments in which the drive unit control circuit 160 and the transmission control circuit 142 are operable to share information via the one or more signal paths 164 in accordance with one or more other conventional communication protocols (e.g., from a conventional databus such as J1587 data bus, J1939 data bus, IESCAN data bus, GMLAN, Mercedes PT-CAN).

Figure 2:
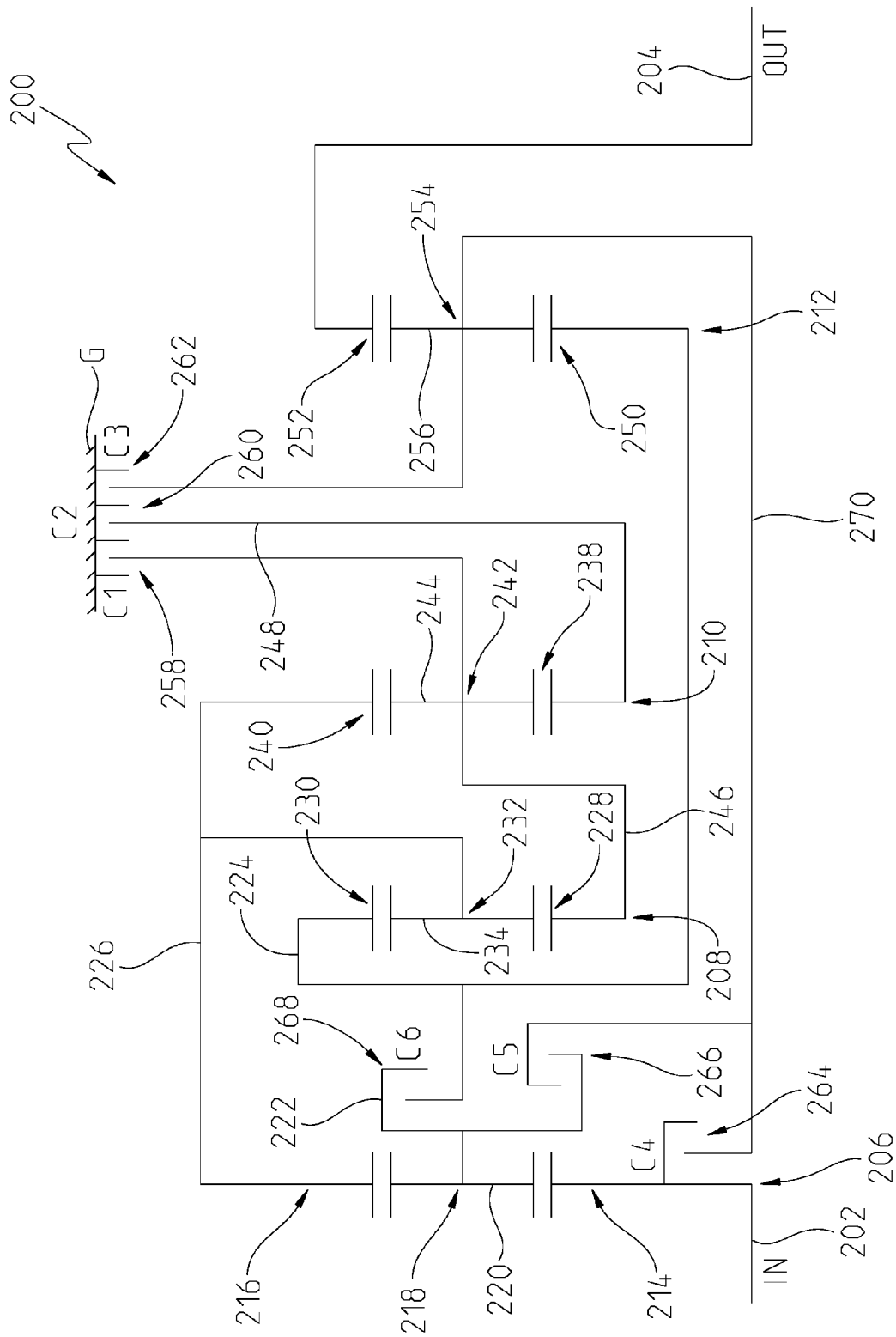
FIG. 2 is a diagrammatic view of an embodiment of a multiple speed transmission.

Referring to FIG. 2, a schematic representation or stick diagram illustrates one embodiment of a multi-speed transmission 200 according to the present disclosure. The transmission 200 includes an input shaft 202 and an output shaft 204. The input shaft 202 and output shaft 204 can be disposed along the same axis or centerline of the transmission 200. In another aspect, the different shafts can be disposed along different axes or centerlines. In a further aspect, the different shafts can be disposed parallel to one another, but along different axes or centerlines. Other aspects can be appreciated by one skilled in the art.

The transmission 200 can also include a plurality of planetary gearsets. In the illustrated embodiment of FIG. 2, the transmission 200 includes a first planetary gearset 206, a second planetary gearset 208, a third planetary gearset 210, and a fourth planetary gearset 212. Each planetary gearset can be referred to as a simple or compound planetary gearset. For example, in some aspects, one or more of the plurality of planetary gearsets can be formed as an idler planetary gearset. In FIG. 2, each of the plurality of gearsets is illustrated as a simple planetary gearset. One or more of the plurality of planetary gearsets can be arranged in different locations within the transmission 200, but for sake of simplicity and in this particular example only, the planetary gearsets are aligned in an axial direction consecutively in sequence (i.e., first, second, third, and fourth between the input and output shafts).

The transmission 200 may also include a plurality of torque-transmitting or gearshifting mechanisms. For example, one or more of these mechanisms can include a clutch or brake. In one aspect, each of the plurality of mechanisms is disposed within an outer housing of the transmission 200. In another aspect, however, one or more of the mechanisms may be disposed outside of the housing. Each of the plurality of mechanisms can be coupled to one or more of the plurality of planetary gearsets, which will be described further below.

In the embodiment of FIG. 2, the transmission 200 can include a first torque-transmitting mechanism 258, a second torque-transmitting mechanism 260, and a third torque-transmitting mechanism 262 that are configured to function as brakes (e.g., the torque-transmitting mechanism is fixedly coupled to the outer housing of the transmission 200). Each brake can be configured as a shiftable-friction-locked disk brake, shiftable friction-locked band brake, shiftable form-locking claw or conical brake, or any other type of known brake. The transmission 200 can also include a fourth torque-transmitting mechanism 264, a fifth torque-transmitting mechanism 266, and a sixth torque-transmitting mechanism 268 that are configured to function as clutches. These can be shiftable friction-locked multi-disk clutches, shiftable form-locking claw or conical clutches, wet clutches, or any other known form of a clutch. With these six torque-transmitting mechanisms, selective shifting of at least ten forward gears and at least one reverse gear is possible.

The transmission 200 of FIG. 2 may also include at least eight or nine different shafts, which is inclusive of the input shaft 202 and output shaft 204. Each of these shafts, designated as a first shaft 222, a second shaft 224, a third shaft 226, a fourth shaft 236, a fifth shaft 246, and a sixth shaft 248 and are configured to be connected to one or more of the plurality of planetary gearsets or plurality of torque-transmitting mechanism between the input shaft 202 and output shaft 204.

In FIG. 2, the first planetary gearset 206 can include a first sun gear 214, a first ring gear 216, and a first carrier member 218 that rotatably supports a set of pinion gears 220. The second planetary gearset 208 can include a second sun gear 228, a second ring gear 230, and a second carrier member 232 that rotatably supports a set of pinion gears 234. The third planetary gearset 210 can include a third sun gear 238, a third ring gear 240, and a third carrier member 242 that rotatably supports a set of pinion gears 244. The fourth planetary gearset 212 can include a fourth sun gear 250, a fourth ring gear 252, and a fourth carrier member 254 that rotatably supports a set of pinion gears 256.

The transmission 200 is capable of transferring torque from the input shaft 202 to the output shaft 204 in at least ten forward gears or ratios and at least one reverse gear or ratio. Each of the forward torque ratios and the reverse torque ratios can be attained by the selective engagement of one or more of the torque-transmitting mechanisms (i.e., torque-transmitting mechanisms 258, 260, 262, 264, 266, and 268). Those skilled in the art will readily understand that a different speed ratio is associated with each torque ratio. Thus, at least ten forward speed ratios and at least one reverse speed ratio may be attained by transmission 200.

As for the transmission 200, kinematic coupling of the first planetary gearset 206 is shown in FIG. 2. The first sun gear 214 is coupled to the input shaft 202 for common rotation therewith. The first carrier member 218 is coupled to the first shaft 222 for common rotation therewith. First ring gear 216 is coupled for common rotation with the third shaft 226. First pinion gears 220 are configured to intermesh with the first sun gear 214 and first ring gear 216.

With respect to the second planetary gearset 208, the second sun gear 228 is coupled to the fifth shaft 246 for common rotation therewith. The second ring gear 230 is coupled to the second shaft 224 for common rotation therewith. The second carrier member 232 is coupled for common rotation with the third shaft 226. Second pinion gears 234 are configured to intermesh with the second sun gear 228 and second ring gear 230.

The third sun gear 238 of the third planetary gearset 210 is coupled to the sixth shaft 248 for common rotation therewith. The third ring gear 240 is coupled to the third shaft 226 for common rotation therewith. Third pinion gears 244 are configured to intermesh with the third sun gear 238 and third ring gear 240, respectively. The third carrier member 242 is coupled for common rotation with the fifth shaft 246.

The kinematic relationship of the fourth planetary gearset 212 is such that the fourth sun gear 250 is coupled to the second shaft 224 for common rotation therewith. The fourth ring gear 252 is coupled to the output shaft 204 for common rotation therewith. The fourth pinion gears 256 are configured to intermesh with the fourth sun gear 250 and the fourth ring gear 252. The fourth carrier member 254 is coupled to the seventh shaft 270 for common rotation therewith.

With regards to the kinematic coupling of the six torque-transmitting mechanisms to the previously described shafts, the multiple speed transmission 200 of FIG. 2 provides that the first torque-transmitting mechanism 258 is arranged within the power flow between the fifth shaft 246 and the housing G of the transmission 200. In this manner, the first torque-transmitting mechanism 258 is configured to act as a brake. The second torque-transmitting mechanism 260 is arranged within the power flow between the sixth shaft 248 and the housing G of the transmission 200. The third torque-transmitting mechanism 262 is arranged within the power flow between the seventh shaft 270 and the housing G of the transmission 200. In this embodiment of the transmission 200 therefore three of the six torque-transmitting mechanisms are configured to act as brakes and the other three torque-transmitting mechanisms are configured to act as clutches.

The fourth torque-transmitting mechanism 264 is arranged within the power flow between the input shaft 202 and the seventh shaft 270. The fifth torque-transmitting mechanism 266 is arranged within the power flow between the first shaft 222 and the seventh shaft 270. The sixth torque-transmitting mechanism 268 is arranged within the power flow between the first shaft 222 and the second shaft 224.

The kinematic couplings of the embodiment in FIG. 2 can further be described with respect to the selective engagement of the torque-transmitting mechanisms with respect to one or more components of the plurality of planetary gearsets. For example, in the transmission 200, the first torque-transmitting mechanism 258 is selectively engageable to couple the third carrier member 242, the second sun gear 228, and the fifth shaft 246 to the housing G of the transmission 200. The second torque-transmitting mechanism 260 is selectively engageable to couple the third sun gear 238 and the sixth shaft 248 to the housing G of the transmission 200. Moreover, the third torque-transmitting mechanism 262 is selectively engageable to couple the fourth carrier member 254 and the seventh shaft 270 to the housing G of the transmission 200. The fourth torque-transmitting mechanism 264 is selectively engageable to couple the input shaft 202 and first sun gear 214 to the fourth carrier member 254 and the seventh shaft 270. The fifth torque-transmitting mechanism 266 is selectively engageable to couple the first carrier member 218 and the first shaft 222 to the fourth carrier member 254 and the seventh shaft 270. Lastly, the sixth torque-transmitting mechanism 268 is selectively engageable to couple the first carrier member 218 and the first shaft 222 to the second ring gear 230, the fourth sun gear 250, and the second shaft 224.

As previously described, the aforementioned embodiment is capable of transmitting torque from a respective input shaft to a respective output shaft in at least ten forward torque ratios and one reverse torque ratio. Referring to FIG. 3, one example of a truth table is shown representing a state of engagement of various torque transmitting mechanisms in each of the available forward and reverse speeds or gear ratios of the transmission illustrated in FIG. 2. It is to be understood that FIG. 3 is only one example of any number of truth tables possible for achieving at least ten forward ratios and one reverse ratio, and one skilled in the art is capable of configuring diameters, gear tooth counts, and gear configurations to achieve other ratios. Moreover, as shown, FIG. 3 provides an example of how the architecture depicted in FIG. 2 may actually achieve up to fourteen forward torque ratios and one reverse torque ratio.

In the example of FIG. 3, a first reverse ratio (R1) can be achieved by the selective engagement of the torque-transmitting mechanisms as set forth in the table. As shown, the first torque-transmitting mechanism (C1), the third torque-transmitting mechanism (C3) and the sixth torque-transmitting mechanism (C6) are selectively engaged to establish the reverse ratio. Thus, in transmission 200 of FIG. 2, the selective engagement of mechanisms 258, 262 and 268 can establish the reverse ratio.

A second reverse ratio (R2) can be achieved by the selective engagement of the torque-transmitting mechanisms as well. As shown, the second torque-transmitting mechanism (C2), the third torque-transmitting mechanism (C3) and the sixth torque-transmitting mechanism (C6) are selectively engaged to establish the second reverse ratio. Thus, in transmission 200 of FIG. 2, the selective engagement of mechanisms 260, 262 and 268 can establish the reverse ratio.

Although not shown in FIG. 3, the transmission may also shift into a neutral range or gear ratio, where none of the torque-transmitting mechanisms carry torque. One or more of the torque-transmitting mechanisms, however, may be engaged in neutral but not carry torque.

A first forward ratio (i.e., Range 1) in the table of FIG. 3 is achieved by engaging two brakes and one of the clutches. In FIG. 2, for example, the second torque-transmitting mechanism 260, the third torque-transmitting mechanism 262, and the fifth torque-transmitting mechanism 266 are engaged. In one embodiment, when transitioning between neutral and the first forward range, two of the second, third and fifth torque-transmitting mechanisms may already be at least partially engaged, whereas the unapplied torque-transmitting mechanism of the three shown in FIG. 3 is selectively engaged to achieve the first forward ratio.

In a second or subsequent forward ratio, indicated as Range 2 in FIG. 3, the first torque-transmitting mechanism, the third torque-transmitting mechanism, and the fifth torque-transmitting mechanism are selectively engaged. Therefore, when transitioning between the first forward ratio and the second forward ratio, the second torque-transmitting mechanism is released and the first torque-transmitting mechanism is engaged.

In a third or subsequent forward ratio, indicated as Range 3 in FIG. 3, the first, second, and fifth torque-transmitting mechanisms are engaged. To transition from the second forward ratio to the third forward ratio, for example, the third torque-transmitting mechanism is released and the second torque-transmitting mechanism is engaged.

In a fourth or the next subsequent forward ratio, indicated as Range 4 in FIG. 3, the first torque-transmitting mechanism, the fifth torque-transmitting mechanism, and sixth torque-transmitting mechanism are engaged. Thus, to transition from the third forward ratio and upshift to the fourth forward ratio, the second torque-transmitting mechanism is released and the sixth torque-transmitting mechanism is engaged.

In a fifth or the next subsequent forward ratio, indicated as Range 5 in FIG. 3, the first torque-transmitting mechanism, the fourth torque-transmitting mechanism, and fifth torque-transmitting mechanism are engaged. Thus, to transition from the fourth forward ratio and upshift to the fifth forward ratio, the sixth torque-transmitting mechanism is released and the fourth torque-transmitting mechanism is engaged.

In a sixth or the next subsequent forward ratio, indicated as Range 6 in FIG. 3, the second torque-transmitting mechanism, the fourth torque-transmitting mechanism, and fifth torque-transmitting mechanism are engaged. Thus, to transition from the fifth forward ratio and upshift to the sixth forward ratio, the first torque-transmitting mechanism is released and the second torque-transmitting mechanism is engaged.

In a seventh or the next subsequent forward ratio, indicated as Range 7 in FIG. 3, the fourth torque-transmitting mechanism, fifth torque-transmitting mechanism, and sixth torque-transmitting mechanism are engaged. Thus, to transition from the sixth forward ratio and upshift to the seventh forward ratio, the second torque-transmitting mechanism is released and the sixth torque-transmitting mechanism is engaged.

In an eighth or the next subsequent forward ratio, indicated as Range 8 in FIG. 3, the second torque-transmitting mechanism, fourth torque-transmitting mechanism, and sixth torque-transmitting mechanism are engaged. Thus, to transition from the seventh forward ratio and upshift to the eighth forward ratio, the fifth torque-transmitting mechanism is released and the second torque-transmitting mechanism is engaged.

In a ninth or the next subsequent forward ratio, indicated as Range 9 in FIG. 3, the first torque-transmitting mechanism, fourth torque-transmitting mechanism, and sixth torque-transmitting mechanism are engaged. Thus, to transition from the eighth forward ratio and upshift to the ninth forward ratio, the second torque-transmitting mechanism is released and the first torque-transmitting mechanism is engaged.

In a tenth or the next subsequent forward ratio, indicated as Range 10 in FIG. 3, the first torque-transmitting mechanism, the second torque-transmitting mechanism, and fourth torque-transmitting mechanism are engaged. Thus, to transition from the ninth forward ratio and upshift to the tenth forward ratio, the sixth torque-transmitting mechanism is released and the second torque-transmitting mechanism is engaged.

As also shown in FIG. 3, the output shaft of the transmission can be selectively locked from rotating in a condition known as hill hold. The hill hold condition can be achieved by selecting engaging the first torque-transmitting mechanism, the second torque-transmitting mechanism, and the third torque-transmitting mechanism.

As shown in FIG. 3, between each subsequent upshift or downshift, at least two of the torque-transmitting mechanisms remains engaged. For example, when upshifting from the fourth forward ratio (Range 4) to the fifth forward ratio (Range 5), the first and fifth torque-transmitting mechanisms are engaged in both forward ratios.

The present disclosure contemplates that downshifts follow the reverse sequence of the corresponding upshift (as described above), and several power-on skip-shifts that are single-transition are possible (e.g. from 1st to 3rd or 3rd to 1st).

Figure 4:
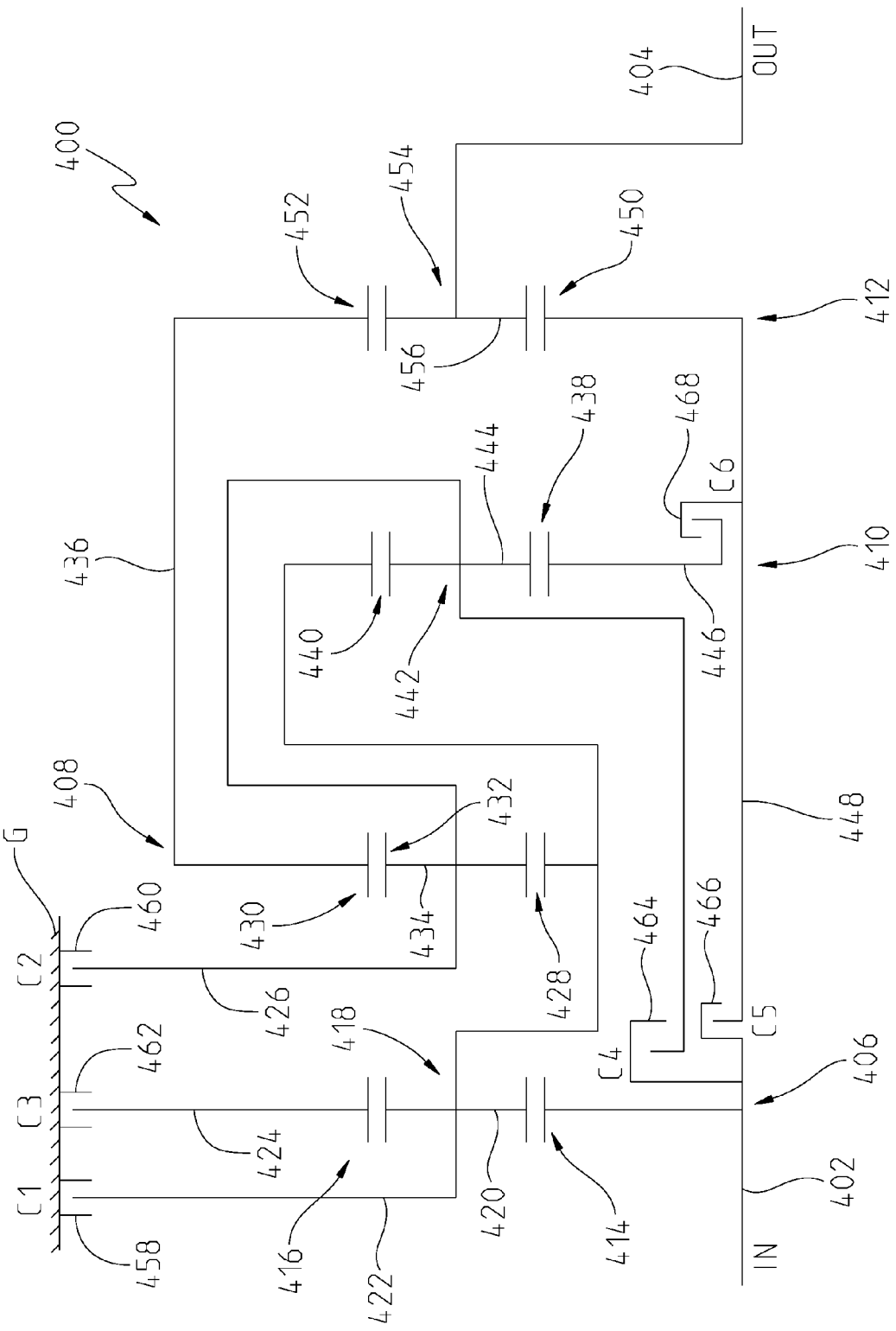
FIG. 4 is a diagrammatic view of an embodiment of a multiple speed transmission.

Referring to FIG. 4, a schematic representation or stick diagram illustrates one embodiment of a multi-speed transmission 400 according to the present disclosure. The transmission 400 includes an input shaft 402 and an output shaft 404. The input shaft 402 and output shaft 404 can be disposed along the same axis or centerline of the transmission 400. In another aspect, the different shafts can be disposed along different axes or centerlines. In a further aspect, the different shafts can be disposed parallel to one another, but along different axes or centerlines. Other aspects can be appreciated by one skilled in the art.

The transmission 400 can also include a plurality of planetary gearsets. In the illustrated embodiment of FIG. 4, the transmission 400 includes a first planetary gearset 406, a second planetary gearset 408, a third planetary gearset 410, and a fourth planetary gearset 412. Each planetary gearset can be referred to as a simple or compound planetary gearset. For example, in some aspects, one or more of the plurality of planetary gearsets can be formed as an idler planetary gearset. In FIG. 4, each of the plurality of gearsets is illustrated as a simple planetary gearset. One or more of the plurality of planetary gearsets can be arranged in different locations within the transmission 400, but for sake of simplicity and in this particular example only, the planetary gearsets are aligned in an axial direction consecutively in sequence (i.e., first, second, third, and fourth between the input and output shafts).

The transmission 400 may also include a plurality of torque-transmitting or gearshifting mechanisms. For example, one or more of these mechanisms can include a clutch or brake. In one aspect, each of the plurality of mechanisms is disposed within an outer housing of the transmission 400. In another aspect, however, one or more of the mechanisms may be disposed outside of the housing. Each of the plurality of mechanisms can be coupled to one or more of the plurality of planetary gearsets, which will be described further below.

In the embodiment of FIG. 4, the transmission 400 can include a first torque-transmitting mechanism 458, a second torque-transmitting mechanism 460, and a third torque-transmitting mechanism 462 that are configured to function as brakes (e.g., the torque-transmitting mechanism is fixedly coupled to the outer housing of the transmission 400). Each brake can be configured as a shiftable-friction-locked disk brake, shiftable friction-locked band brake, shiftable form-locking claw or conical brake, or any other type of known brake. The transmission 400 can also include a fourth torque-transmitting mechanism 464, a fifth torque-transmitting mechanism 466, and a sixth torque-transmitting mechanism 468 that are configured to function as clutches. These can be shiftable friction-locked multi-disk clutches, shiftable form-locking claw or conical clutches, wet clutches, or any other known form of a clutch. With these six torque-transmitting mechanisms, selective shifting of at least ten forward gears and at least one reverse gear is possible.

The transmission 400 of FIG. 4 may also include at least eight or nine different shafts, which is inclusive of the input shaft 402 and output shaft 404. Each of these shafts, designated as a first shaft 422, a second shaft 424, a third shaft 426, a fourth shaft 436, a fifth shaft 446, and a sixth shaft 448 and are configured to be connected to one or more of the plurality of planetary gearsets or plurality of torque-transmitting mechanism between the input shaft 402 and output shaft 404.

In FIG. 4, the first planetary gearset 406 can include a first sun gear 414, a first ring gear 416, and a first carrier member 418 that rotatably supports a set of pinion gears 420. The second planetary gearset 408 can include a second sun gear 428, a second ring gear 430, and a second carrier member 432 that rotatably supports a set of pinion gears 434. The third planetary gearset 410 can include a third sun gear 438, a third ring gear 440, and a third carrier member 442 that rotatably supports a set of pinion gears 444. The fourth planetary gearset 412 can include a fourth sun gear 450, a fourth ring gear 452, and a fourth carrier member 454 that rotatably supports a set of pinion gears 456.

The transmission 400 is capable of transferring torque from the input shaft 402 to the output shaft 404 in at least ten forward gears or ratios and at least one reverse gear or ratio. Each of the forward torque ratios and the reverse torque ratios can be attained by the selective engagement of one or more of the torque-transmitting mechanisms (i.e., torque-transmitting mechanisms 458, 460, 462, 464, 466, and 468). Those skilled in the art will readily understand that a different speed ratio is associated with each torque ratio. Thus, at least ten forward speed ratios and at least one reverse speed ratio may be attained by transmission 400.

As for the transmission 400, kinematic coupling of the first planetary gearset 406 is shown in FIG. 4. The first sun gear 414 is coupled to the input shaft 402 for common rotation therewith. The first carrier member 418 is coupled to the first shaft 422 for common rotation therewith. First ring gear 416 is coupled for common rotation with the second shaft 424. First pinion gears 420 are configured to intermesh with the first sun gear 414 and first ring gear 416.

With respect to the second planetary gearset 408, the second sun gear 428 is coupled to the first shaft 422 for common rotation therewith. The second ring gear 430 is coupled to the fourth shaft 436 for common rotation therewith. The second carrier member 432 is coupled for common rotation with the third shaft 426. Second pinion gears 434 are configured to intermesh with the second sun gear 428 and second ring gear 430.

The third sun gear 438 of the third planetary gearset 410 is coupled to the fifth shaft 446 for common rotation therewith. The third ring gear 440 is coupled to the first shaft 422 for common rotation therewith. Third pinion gears 444 are configured to intermesh with the third sun gear 438 and third ring gear 440, respectively. The third carrier member 442 is coupled for common rotation with the third shaft 426.

The kinematic relationship of the fourth planetary gearset 412 is such that the fourth sun gear 450 is coupled to the sixth shaft 468 for common rotation therewith. The fourth ring gear 452 is coupled to the fourth shaft 436 for common rotation therewith. The fourth pinion gears 456 are configured to intermesh with the fourth sun gear 450 and the fourth ring gear 452. The fourth carrier member 454 is coupled to the output shaft 404 for common rotation therewith.

With regards to the kinematic coupling of the six torque-transmitting mechanisms to the previously described shafts, the multiple speed transmission 400 of FIG. 4 provides that the first torque-transmitting mechanism 458 is arranged within the power flow between the first shaft 422 and the housing G of the transmission 400. In this manner, the first torque-transmitting mechanism 458 is configured to act as a brake. The second torque-transmitting mechanism 460 is arranged within the power flow between the third shaft 426 and the housing G of the transmission 400. The third torque-transmitting mechanism 462 is arranged within the power flow between the second shaft 424 and the housing G of the transmission 400. In this embodiment of the transmission 400 therefore three of the six torque-transmitting mechanisms are configured to act as brakes and the other three torque-transmitting mechanisms are configured to act as clutches.

The fourth torque-transmitting mechanism 464 is arranged within the power flow between the input shaft 402 and the third shaft 426. The fifth torque-transmitting mechanism 466 is arranged within the power flow between the input shaft 402 and the sixth shaft 468. The sixth torque-transmitting mechanism 468 is arranged within the power flow between the fifth shaft 446 and the sixth shaft 468.

The kinematic couplings of the embodiment in FIG. 4 can further be described with respect to the selective engagement of the torque-transmitting mechanisms with respect to one or more components of the plurality of planetary gearsets. For example, in the transmission 400, the first torque-transmitting mechanism 458 is selectively engageable to couple the first carrier member 418, the second sun gear 428, the third ring gear 440, and the first shaft 422 to the housing G of the transmission 400. The second torque-transmitting mechanism 460 is selectively engageable to couple the second carrier member 432, the third carrier member 442, and the third shaft 426 to the housing G of the transmission 400. Moreover, the third torque-transmitting mechanism 462 is selectively engageable to couple the first ring gear 416 and the second shaft 424 to the housing G of the transmission 400. The fourth torque-transmitting mechanism 464 is selectively engageable to couple the input shaft 402 and first sun gear 414 to the second carrier member 432, the third carrier member 442, and the third shaft 426. The fifth torque-transmitting mechanism 466 is selectively engageable to couple the input shaft 402 and the first sun gear 414 to the fourth sun gear 450 and the sixth shaft 468. Lastly, the sixth torque-transmitting mechanism 468 is selectively engageable to couple the fourth sun gear 450 and the sixth shaft 468 to the third sun gear 438 and the fifth shaft 446.

As previously described, the aforementioned embodiment is capable of transmitting torque from a respective input shaft to a respective output shaft in at least ten forward torque ratios and one reverse torque ratio. Referring to FIG. 5, one example of a truth table is shown representing a state of engagement of various torque transmitting mechanisms in each of the available forward and reverse speeds or gear ratios of the transmission illustrated in FIG. 4. It is to be understood that FIG. 5 is only one example of any number of truth tables possible for achieving at least ten forward ratios and one reverse ratio, and one skilled in the art is capable of configuring diameters, gear tooth counts, and gear configurations to achieve other ratios. Moreover, as shown, FIG. 5 provides an example of how the architecture depicted in FIG. 4 may actually achieve up to fourteen forward torque ratios and one reverse torque ratio.

In the example of FIG. 4, a first reverse ratio (R1) can be achieved by the selective engagement of the torque-transmitting mechanisms as set forth in the table. As shown, the second torque-transmitting mechanism (C2), the third torque-transmitting mechanism (C3) and the sixth torque-transmitting mechanism (C6) are selectively engaged to establish the reverse ratio. Thus, in transmission 400 of FIG. 4, the selective engagement of mechanisms 260, 262 and 268 can establish the reverse ratio. Although a second reverse ratio is not shown, there may be more than one reverse ratio capable of being achieved based on the selective engagement of different torque-transmitting mechanisms, as is known by one skilled in the art. Moreover, the transmission may also shift into a neutral range or gear ratio, where none of the torque-transmitting mechanisms carry torque. One or more of the torque-transmitting mechanisms, however, may be engaged in neutral but not carry torque.

A first forward ratio (i.e., Range 1) in the table of FIG. 5 is achieved by engaging two brakes and one of the clutches. In FIG. 4, for example, the second torque-transmitting mechanism 260, the third torque-transmitting mechanism 262, and the fifth torque-transmitting mechanism 266 are engaged. In one embodiment, when transitioning between neutral and the first forward range, two of the second, third and fifth torque-transmitting mechanisms may already be at least partially engaged, whereas the unapplied torque-transmitting mechanism of the three shown in FIG. 5 is selectively engaged to achieve the first forward ratio.

In a second or subsequent forward ratio, indicated as Range 2 in FIG. 5, the first torque-transmitting mechanism, the second torque-transmitting mechanism, and the fifth torque-transmitting mechanism are selectively engaged. Therefore, when transitioning between the first forward ratio and the second forward ratio, the third torque-transmitting mechanism is released and the first torque-transmitting mechanism is engaged.

In a third or subsequent forward ratio, indicated as Range 3 in FIG. 5, the second, fifth, and sixth torque-transmitting mechanisms are engaged. To transition from the second forward ratio to the third forward ratio, for example, the first torque-transmitting mechanism is released and the sixth torque-transmitting mechanism is engaged.

In a fourth or the next subsequent forward ratio, indicated as Range 4 in FIG. 5, the first torque-transmitting mechanism, the fifth torque-transmitting mechanism, and sixth torque-transmitting mechanism are engaged. Thus, to transition from the third forward ratio and upshift to the fourth forward ratio, the second torque-transmitting mechanism is released and the first torque-transmitting mechanism is engaged.

In a fifth or the next subsequent forward ratio, indicated as Range 5 in FIG. 5, the third torque-transmitting mechanism, the fifth torque-transmitting mechanism, and sixth torque-transmitting mechanism are engaged. Thus, to transition from the fourth forward ratio and upshift to the fifth forward ratio, the first torque-transmitting mechanism is released and the third torque-transmitting mechanism is engaged.

In a sixth or the next subsequent forward ratio, indicated as Range 6 in FIG. 5, the fourth torque-transmitting mechanism, the fifth torque-transmitting mechanism, and sixth torque-transmitting mechanism are engaged. Thus, to transition from the fifth forward ratio and upshift to the sixth forward ratio, the third torque-transmitting mechanism is released and the fourth torque-transmitting mechanism is engaged.

In a seventh or the next subsequent forward ratio, indicated as Range 7 in FIG. 5, the third torque-transmitting mechanism, fourth torque-transmitting mechanism, and fifth torque-transmitting mechanism are engaged. Thus, to transition from the sixth forward ratio and upshift to the seventh forward ratio, the sixth torque-transmitting mechanism is released and the third torque-transmitting mechanism is engaged.

In an eighth or the next subsequent forward ratio, indicated as Range 8 in FIG. 5, the first torque-transmitting mechanism, fourth torque-transmitting mechanism, and fifth torque-transmitting mechanism are engaged. Thus, to transition from the seventh forward ratio and upshift to the eighth forward ratio, the third torque-transmitting mechanism is released and the first torque-transmitting mechanism is engaged.

In a ninth or the next subsequent forward ratio, indicated as Range 9 in FIG. 5, the third torque-transmitting mechanism, fourth torque-transmitting mechanism, and sixth torque-transmitting mechanism are engaged. Thus, to transition from the eighth forward ratio and upshift to the ninth forward ratio, the first and fifth torque-transmitting mechanisms are released and the third and sixth torque-transmitting mechanisms are engaged.

In a tenth or the next subsequent forward ratio, indicated as Range 10 in FIG. 5, the first torque-transmitting mechanism, the fourth torque-transmitting mechanism, and sixth torque-transmitting mechanism are engaged. Thus, to transition from the ninth forward ratio and upshift to the tenth forward ratio, the third torque-transmitting mechanism is released and the first torque-transmitting mechanism is engaged.

Although not shown in FIG. 5, the output shaft of the transmission can be selectively locked from rotating in a condition known as hill hold. The hill hold condition can be achieved by selecting engaging the first torque-transmitting mechanism, the second torque-transmitting mechanism, and the sixth torque-transmitting mechanism.

The present disclosure contemplates that downshifts follow the reverse sequence of the corresponding upshift (as described above), and several power-on skip-shifts that are single-transition are possible (e.g. from 1st to 3rd or 3rd to 1st).

Figure 6:
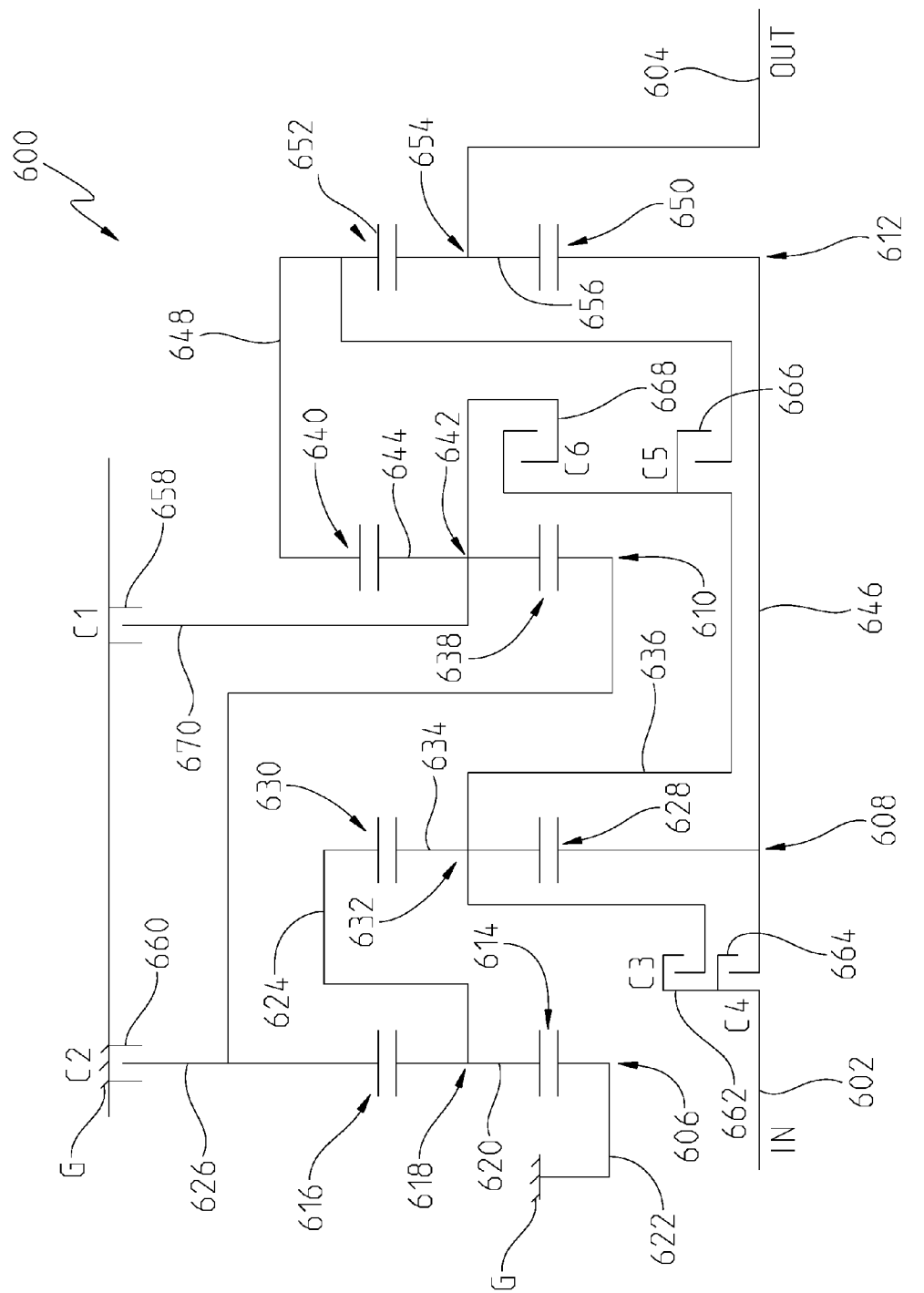
FIG. 6 is a diagrammatic view of an embodiment of a multiple speed transmission.

Referring to FIG. 6, a schematic representation or stick diagram illustrates one embodiment of a multi-speed transmission 600 according to the present disclosure. The transmission 600 includes an input shaft 602 and an output shaft 604. The input shaft 602 and output shaft 604 can be disposed along the same axis or centerline of the transmission 600. In another aspect, the different shafts can be disposed along different axes or centerlines. In a further aspect, the different shafts can be disposed parallel to one another, but along different axes or centerlines. Other aspects can be appreciated by one skilled in the art.

The transmission 600 can also include a plurality of planetary gearsets. In the illustrated embodiment of FIG. 6, the transmission 600 includes a first planetary gearset 606, a second planetary gearset 608, a third planetary gearset 610, and a fourth planetary gearset 612. Each planetary gearset can be referred to as a simple or compound planetary gearset. For example, in some aspects, one or more of the plurality of planetary gearsets can be formed as an idler planetary gearset. In FIG. 6, each of the plurality of gearsets is illustrated as a simple planetary gearset. One or more of the plurality of planetary gearsets can be arranged in different locations within the transmission 600, but for sake of simplicity and in this particular example only, the planetary gearsets are aligned in an axial direction consecutively in sequence (i.e., first, second, third, and fourth between the input and output shafts).

The transmission 600 may also include a plurality of torque-transmitting or gearshifting mechanisms. For example, one or more of these mechanisms can include a clutch or brake. In one aspect, each of the plurality of mechanisms is disposed within an outer housing of the transmission 600. In another aspect, however, one or more of the mechanisms may be disposed outside of the housing. Each of the plurality of mechanisms can be coupled to one or more of the plurality of planetary gearsets, which will be described further below.

In the embodiment of FIG. 6, the transmission 600 can include a first torque-transmitting mechanism 658 and a second torque-transmitting mechanism 660 are configured to function as brakes (e.g., the torque-transmitting mechanism is fixedly coupled to the outer housing of the transmission 600). Each brake can be configured as a shiftable-friction-locked disk brake, shiftable friction-locked band brake, shiftable form-locking claw or conical brake, or any other type of known brake. The transmission 600 can also include a third torque-transmitting mechanism 662, a fourth torque-transmitting mechanism 664, a fifth torque-transmitting mechanism 666, and a sixth torque-transmitting mechanism 668 that are configured to function as clutches. These can be shiftable friction-locked multi-disk clutches, shiftable form-locking claw or conical clutches, wet clutches, or any other known form of a clutch. With these six torque-transmitting mechanisms, selective shifting of at least ten forward gears and at least one reverse gear is possible.

The transmission 600 of FIG. 6 may also include at least eight or nine different shafts, which is inclusive of the input shaft 602 and output shaft 604. Each of these shafts, designated as a first shaft 622, a second shaft 624, a third shaft 626, a fourth shaft 636, a fifth shaft 646, a sixth shaft 648, and a seventh shaft 670 and are configured to be connected to one or more of the plurality of planetary gearsets or plurality of torque-transmitting mechanism between the input shaft 602 and output shaft 604.

In FIG. 6, the first planetary gearset 606 can include a first sun gear 614, a first ring gear 616, and a first carrier member 618 that rotatably supports a set of pinion gears 620. The second planetary gearset 608 can include a second sun gear 628, a second ring gear 630, and a second carrier member 632 that rotatably supports a set of pinion gears 634. The third planetary gearset 610 can include a third sun gear 638, a third ring gear 640, and a third carrier member 642 that rotatably supports a set of pinion gears 644. The fourth planetary gearset 612 can rotatably supports a set of pinion gears 656.

The transmission 600 is capable of transferring torque from the input shaft 602 to the output shaft 604 in at least ten forward gears or ratios and at least one reverse gear or ratio. Each of the forward torque ratios and the reverse torque ratios can be attained by the selective engagement of one or more of the torque-transmitting mechanisms (i.e., torque-transmitting mechanisms 658, 660, 662, 664, 666, and 668). Those skilled in the art will readily understand that a different speed ratio is associated with each torque ratio. Thus, at least ten forward speed ratios and at least one reverse speed ratio may be attained by transmission 600.

As for the transmission 600, kinematic coupling of the first planetary gearset 606 is shown in FIG. 6. The first sun gear 614 is coupled to the first shaft 622 for common rotation therewith. The first carrier member 618 is coupled to the second shaft 624 for common rotation therewith. First ring gear 616 is coupled for common rotation with the third shaft 626. First pinion gears 620 are configured to intermesh with the first sun gear 614 and first ring gear 616.

With respect to the second planetary gearset 608, the second sun gear 628 is coupled to the fifth shaft 646 for common rotation therewith. The second ring gear 630 is coupled to the second shaft 624 for common rotation therewith. The second carrier member 632 is coupled for common rotation with the fourth shaft 636. Second pinion gears 634 are configured to intermesh with the second sun gear 628 and second ring gear 630.

The third sun gear 638 of the third planetary gearset 610 is coupled to the third shaft 626 for common rotation therewith. The third ring gear 640 is coupled to the sixth shaft 648 for common rotation therewith. Third pinion gears 644 are configured to intermesh with the third sun gear 638 and third ring gear 640, respectively. The third carrier member 642 is coupled for common rotation with the seventh shaft 670.

The kinematic relationship of the fourth planetary gearset 612 is such that the fourth sun gear 650 is coupled to the fifth shaft 646 for common rotation therewith. The fourth ring gear 652 is coupled to the sixth shaft 648 for common rotation therewith. The fourth pinion gears 656 are configured to intermesh with the fourth sun gear 650 and the fourth ring gear 652. The fourth carrier member 654 is coupled to the output shaft 604 for common rotation therewith.

With regards to the kinematic coupling of the six torque-transmitting mechanisms to the previously described shafts, the multiple speed transmission 600 of FIG. 6 provides that the first torque-transmitting mechanism 658 is arranged within the power flow between the seventh shaft 670 and the housing G of the transmission 600. In this manner, the first torque-transmitting mechanism 658 is configured to act as a brake. The second torque-transmitting mechanism 660 is arranged within the power flow between the third shaft 626 and the housing G of the transmission 600. The third torque-transmitting mechanism 662 is arranged within the power flow between the input shaft 602 and the fourth shaft 636 of the transmission 600. The fourth torque-transmitting mechanism 664 is arranged within the power flow between the input shaft 602 and the fifth shaft 646. The fifth torque-transmitting mechanism 666 is arranged within the power flow between the fourth shaft 636 and the sixth shaft 648. The sixth torque-transmitting mechanism 668 is arranged within the power flow between the fourth shaft 636 and the seventh shaft 670.

The kinematic couplings of the embodiment in FIG. 6 can further be described with respect to the selective engagement of the torque-transmitting mechanisms with respect to one or more components of the plurality of planetary gearsets. For example, in the transmission 600, the first torque-transmitting mechanism 658 is selectively engageable to couple the third carrier member 642 and the seventh shaft 670 to the housing G of the transmission 600. The second torque-transmitting mechanism 660 is selectively engageable to couple the first ring gear 616, the third sun gear 638, and the third shaft 626 to the housing G of the transmission 600. Moreover, the third torque-transmitting mechanism 662 is selectively engageable to couple the input shaft 602 to the second carrier member 632 and the fourth shaft 636. The fourth torque-transmitting mechanism 664 is selectively engageable to couple the input shaft 602 to the second sun gear 628, the fourth sun gear 650, and the fifth shaft 646. The fifth torque-transmitting mechanism 666 is selectively engageable to couple the second carrier member 632 and the fourth shaft 636 to the fourth ring gear 652, the third ring gear 640, and the sixth shaft 648. Lastly, the sixth torque-transmitting mechanism 668 is selectively engageable to couple the second carrier member 632 and the fourth shaft 636 to the third carrier member 642 and the seventh shaft 670.

As previously described, the aforementioned embodiment is capable of transmitting torque from a respective input shaft to a respective output shaft in at least ten forward torque ratios and one reverse torque ratio. Referring to FIG. 7, one example of a truth table is shown representing a state of engagement of various torque transmitting mechanisms in each of the available forward and reverse speeds or gear ratios of the transmission illustrated in FIG. 6. It is to be understood that FIG. 7 is only one example of any number of truth tables possible for achieving at least ten forward ratios and one reverse ratio, and one skilled in the art is capable of configuring diameters, gear tooth counts, and gear configurations to achieve other ratios. Moreover, as shown, FIG. 7 provides an example of how the architecture depicted in FIG. 6 may actually achieve up to fourteen forward torque ratios and one reverse torque ratio.

In the example of FIG. 7, a first reverse ratio (R1) can be achieved by the selective engagement of the torque-transmitting mechanisms as set forth in the table. As shown, the first torque-transmitting mechanism (C1), the third torque-transmitting mechanism (C3) and the fourth torque-transmitting mechanism (C4) are selectively engaged to establish the reverse ratio. Thus, in transmission 600 of FIG. 6, the selective engagement of mechanisms 258, 262 and 264 can establish the reverse ratio. Other reverse ratios are also possible by the selective engagement of torque-transmitting mechanisms other than those shown in FIG. 7. Moreover, while not shown in FIG. 7, the transmission may also shift into a neutral range or gear ratio, where none of the torque-transmitting mechanisms carry torque. One or more of the torque-transmitting mechanisms, however, may be engaged in neutral but not carry torque.

A first forward ratio (i.e., Range 1) in the table of FIG. 7 is achieved by engaging two brakes and one of the clutches. In FIG. 6, for example, the first torque-transmitting mechanism 658, the second torque-transmitting mechanism 660, and the fourth torque-transmitting mechanism 664 are engaged. In one embodiment, when transitioning between neutral and the first forward range, two of the second, third and fifth torque-transmitting mechanisms may already be at least partially engaged, whereas the unapplied torque-transmitting mechanism of the three shown in FIG. 7 is selectively engaged to achieve the first forward ratio.

In a second or subsequent forward ratio, indicated as Range 2 in FIG. 7, the first torque-transmitting mechanism, the fourth torque-transmitting mechanism, and the fifth torque-transmitting mechanism are selectively engaged. Therefore, when transitioning between the first forward ratio and the second forward ratio, the second torque-transmitting mechanism is released and the fifth torque-transmitting mechanism is engaged.

In a third or subsequent forward ratio, indicated as Range 3 in FIG. 7, the second, fourth, and fifth torque-transmitting mechanisms are engaged. To transition from the second forward ratio to the third forward ratio, for example, the first torque-transmitting mechanism is released and the second torque-transmitting mechanism is engaged.

In a fourth or the next subsequent forward ratio, indicated as Range 4 in FIG. 7, the second torque-transmitting mechanism, the fourth torque-transmitting mechanism, and sixth torque-transmitting mechanism are engaged. Thus, to transition from the third forward ratio and upshift to the fourth forward ratio, the fifth torque-transmitting mechanism is released and the sixth torque-transmitting mechanism is engaged.

In a fifth or the next subsequent forward ratio, indicated as Range 5 in FIG. 7, the fourth torque-transmitting mechanism, the fifth torque-transmitting mechanism, and sixth torque-transmitting mechanism are engaged. Thus, to transition from the fourth forward ratio and upshift to the fifth forward ratio, the second torque-transmitting mechanism is released and the fifth torque-transmitting mechanism is engaged.

In a sixth or the next subsequent forward ratio, indicated as Range 6 in FIG. 7, the third torque-transmitting mechanism, the fourth torque-transmitting mechanism, and sixth torque-transmitting mechanism are engaged. Thus, to transition from the fifth forward ratio and upshift to the sixth forward ratio, the fifth torque-transmitting mechanism is released and the third torque-transmitting mechanism is engaged.

In a seventh or the next subsequent forward ratio, indicated as Range 7 in FIG. 7, the third torque-transmitting mechanism, the fourth torque-transmitting mechanism, and fifth torque-transmitting mechanism are engaged. Thus, to transition from the sixth forward ratio and upshift to the seventh forward ratio, the sixth torque-transmitting mechanism is released and the fifth torque-transmitting mechanism is engaged.

In an eighth or the next subsequent forward ratio, indicated as Range 8 in FIG. 7, the third torque-transmitting mechanism, fifth torque-transmitting mechanism, and sixth torque-transmitting mechanism are engaged. Thus, to transition from the seventh forward ratio and upshift to the eighth forward ratio, the fourth torque-transmitting mechanism is released and the sixth torque-transmitting mechanism is engaged.

In a ninth or the next subsequent forward ratio, indicated as Range 9 in FIG. 7, the second torque-transmitting mechanism, third torque-transmitting mechanism, and fifth torque-transmitting mechanism are engaged. Thus, to transition from the eighth forward ratio and upshift to the ninth forward ratio, the sixth torque-transmitting mechanism is released and the second torque-transmitting mechanism is engaged.

In a tenth or the next subsequent forward ratio, indicated as Range 10 in FIG. 7, the second torque-transmitting mechanism, the third torque-transmitting mechanism, and sixth torque-transmitting mechanism are engaged. Thus, to transition from the ninth forward ratio and upshift to the tenth forward ratio, the fifth torque-transmitting mechanism is released and the second torque-transmitting mechanism is engaged.

As also shown in FIG. 7, the output shaft of the transmission can be selectively locked from rotating in a condition known as hill hold. The hill hold condition can be achieved by selecting engaging the first torque-transmitting mechanism, the second torque-transmitting mechanism, and the sixth torque-transmitting mechanism.

The present disclosure contemplates that downshifts follow the reverse sequence of the corresponding upshift (as described above), and several power-on skip-shifts that are single-transition are possible (e.g. from 1st to 3rd or 3rd to 1st).

Figure 12:
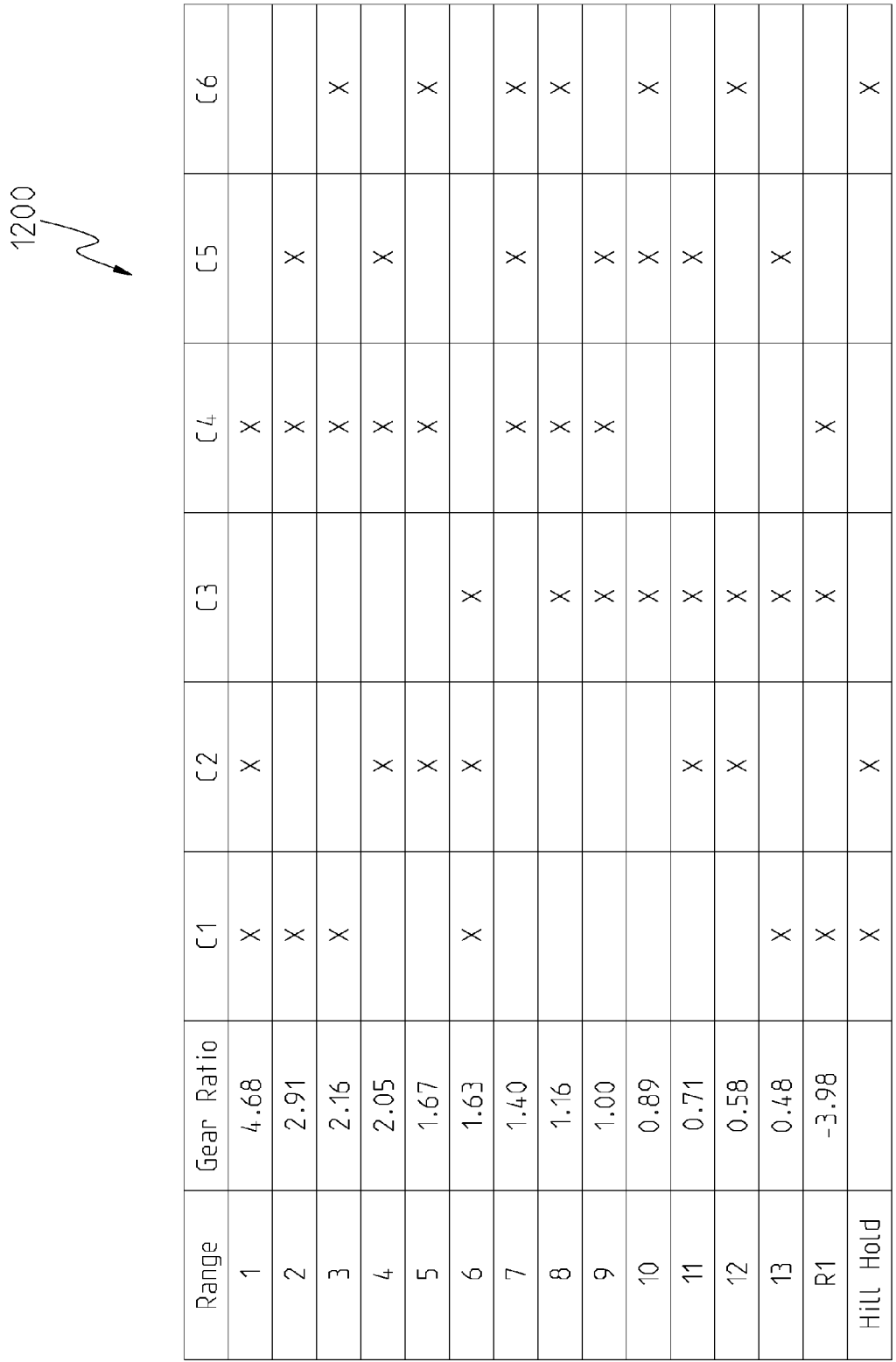
FIG. 12 is a truth table presenting an example of a state of engagement of various torque transmitting mechanisms in each of the available forward and reverse speeds or gear ratios of the transmissions illustrated in FIG. 6.

The aforementioned embodiment of FIG. 6 is also capable of transmitting torque from a respective input shaft to a respective output shaft in more than ten forward torque ratios and one reverse torque ratio. Referring to FIG. 12, for example, a truth table 1200 is shown representing a state of engagement of various torque transmitting mechanisms in each of the available forward and reverse speeds or gear ratios of the transmission illustrated in FIG. 6. It is to be understood that FIG. 12 is only one example of any number of truth tables possible for achieving ten or more forward ratios and one reverse ratio, and one skilled in the art is capable of configuring diameters, gear tooth counts, and gear configurations to achieve other ratios. Moreover, as shown, FIG. 12 provides an example of how the architecture depicted in FIG. 6 may actually achieve up to thirteen forward torque ratios and one reverse torque ratio.

In the example of FIG. 12, a first reverse ratio (R1) can be achieved by the selective engagement of the torque-transmitting mechanisms as set forth in the table. As shown, the first torque-transmitting mechanism (C1), the second torque-transmitting mechanism (C2) and the sixth torque-transmitting mechanism (C6) are selectively engaged to establish the reverse ratio. Thus, in transmission 600 of FIG. 6, the selective engagement of mechanisms 258, 260 and 268 can establish the reverse ratio. Other reverse ratios are also possible by the selective engagement of torque-transmitting mechanisms other than those shown in FIG. 12. Moreover, while not shown in FIG. 12, the transmission may also shift into a neutral range or gear ratio, where none of the torque-transmitting mechanisms carry torque. One or more of the torque-transmitting mechanisms, however, may be engaged in neutral but not carry torque.

A first forward ratio (i.e., Range 1) in the table of FIG. 12 is achieved by engaging two brakes and one of the clutches. In FIG. 6, for example, the first torque-transmitting mechanism 658, the second torque-transmitting mechanism 660, and the fourth torque-transmitting mechanism 664 are engaged. In one embodiment, when transitioning between neutral and the first forward range, two of the second, third and fifth torque-transmitting mechanisms may already be at least partially engaged, whereas the unapplied torque-transmitting mechanism of the three shown in FIG. 12 is selectively engaged to achieve the first forward ratio.

In a second or subsequent forward ratio, indicated as Range 2 in FIG. 12, the first torque-transmitting mechanism, the fourth torque-transmitting mechanism, and the fifth torque-transmitting mechanism are selectively engaged. Therefore, when transitioning between the first forward ratio and the second forward ratio, the second torque-transmitting mechanism is released and the fifth torque-transmitting mechanism is engaged.

In a third or subsequent forward ratio, indicated as Range 3 in FIG. 12, the first, fourth, and sixth torque-transmitting mechanisms are engaged. To transition from the second forward ratio to the third forward ratio, for example, the fifth torque-transmitting mechanism is released and the sixth torque-transmitting mechanism is engaged.

In a fourth or the next subsequent forward ratio, indicated as Range 4 in FIG. 12, the second torque-transmitting mechanism, the fourth torque-transmitting mechanism, and fifth torque-transmitting mechanism are engaged. Thus, to transition from the third forward ratio and upshift to the fourth forward ratio, the first and sixth torque-transmitting mechanisms are released and the second and fifth torque-transmitting mechanisms are engaged.

In a fifth or the next subsequent forward ratio, indicated as Range 5 in FIG. 12, the second torque-transmitting mechanism, the fourth torque-transmitting mechanism, and sixth torque-transmitting mechanism are engaged. Thus, to transition from the fourth forward ratio and upshift to the fifth forward ratio, the fifth torque-transmitting mechanism is released and the sixth torque-transmitting mechanism is engaged.

In a sixth or the next subsequent forward ratio, indicated as Range 6 in FIG. 12, the first torque-transmitting mechanism, the second torque-transmitting mechanism, and third torque-transmitting mechanism are engaged. Thus, to transition from the fifth forward ratio and upshift to the sixth forward ratio, the fourth and sixth torque-transmitting mechanisms are released and the first and third torque-transmitting mechanisms are engaged.

In a seventh or the next subsequent forward ratio, indicated as Range 7 in FIG. 12, the fourth torque-transmitting mechanism, the fifth torque-transmitting mechanism, and sixth torque-transmitting mechanism are engaged. Thus, to transition from the sixth forward ratio and upshift to the seventh forward ratio, each of the torque-transmitting mechanisms engaged in sixth range are disengaged, whereas each of the disengaged torque-transmitting mechanisms in seventh range are engaged.

In an eighth or the next subsequent forward ratio, indicated as Range 8 in FIG. 12, the third torque-transmitting mechanism, fourth torque-transmitting mechanism, and sixth torque-transmitting mechanism are engaged. Thus, to transition from the seventh forward ratio and upshift to the eighth forward ratio, the fifth torque-transmitting mechanism is released and the third torque-transmitting mechanism is engaged.

In a ninth or the next subsequent forward ratio, indicated as Range 9 in FIG. 12, the third torque-transmitting mechanism, the fourth torque-transmitting mechanism, and the fifth torque-transmitting mechanism are engaged. Thus, to transition from the eighth forward ratio and upshift to the ninth forward ratio, the sixth torque-transmitting mechanism is released and the fifth torque-transmitting mechanism is engaged.

In a tenth or the next subsequent forward ratio, indicated as Range 10 in FIG. 12, the third torque-transmitting mechanism, the fifth torque-transmitting mechanism, and sixth torque-transmitting mechanism are engaged. Thus, to transition from the ninth forward ratio and upshift to the tenth forward ratio, the fourth torque-transmitting mechanism is released and the sixth torque-transmitting mechanism is engaged.

In an eleventh or the next subsequent forward ratio, indicated as Range 11 in FIG. 12, the second torque-transmitting mechanism, the third torque-transmitting mechanism, and fifth torque-transmitting mechanism are engaged. Thus, to transition from the tenth forward ratio and upshift to the eleventh forward ratio, the sixth torque-transmitting mechanism is released and the second torque-transmitting mechanism is engaged.

In a twelfth or the next subsequent forward ratio, indicated as Range 12 in FIG. 12, the second torque-transmitting mechanism, the third torque-transmitting mechanism, and sixth torque-transmitting mechanism are engaged. Thus, to transition from the eleventh forward ratio and upshift to the twelfth forward ratio, the fifth torque-transmitting mechanism is released and the sixth torque-transmitting mechanism is engaged.

In a thirteenth or the next subsequent forward ratio, indicated as Range 13 in FIG. 12, the first torque-transmitting mechanism, the third torque-transmitting mechanism, and fifth torque-transmitting mechanism are engaged. Thus, to transition from the twelfth forward ratio and upshift to the thirteenth forward ratio, the second and sixth torque-transmitting mechanisms are released and the first and fifth torque-transmitting mechanisms are engaged.

As also shown in FIG. 12, the output shaft of the transmission can be selectively locked from rotating in a condition known as hill hold. The hill hold condition can be achieved by selecting engaging the first torque-transmitting mechanism, the second torque-transmitting mechanism, and the sixth torque-transmitting mechanism.

The present disclosure contemplates that downshifts follow the reverse sequence of the corresponding upshift (as described above), and several power-on skip-shifts that are single-transition are possible (e.g. from 1st to 3rd or 3rd to 1st).

Figure 8:
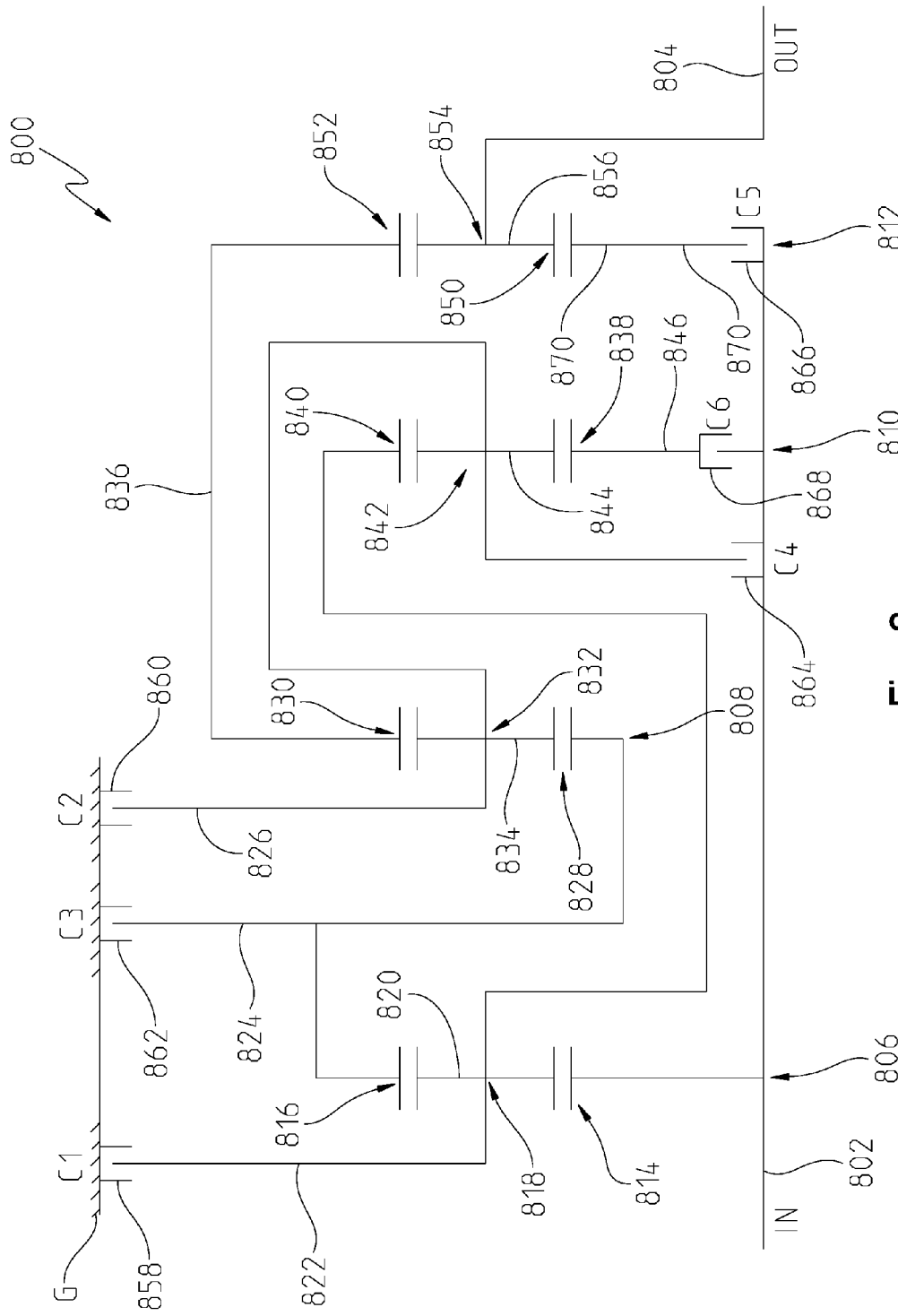
FIG. 8 is a diagrammatic view of an embodiment of a multiple speed transmission.

Turning now to FIG. 8, a schematic representation or stick diagram illustrates one embodiment of a multi-speed transmission 800 according to the present disclosure. The transmission 800 includes an input shaft 802 and an output shaft 804. The input shaft 802 and output shaft 804 can be disposed along the same axis or centerline of the transmission 800. In another aspect, the different shafts can be disposed along different axes or centerlines. In a further aspect, the different shafts can be disposed parallel to one another, but along different axes or centerlines. Other aspects can be appreciated by one skilled in the art.

The transmission 800 can also include a plurality of planetary gearsets. In the illustrated embodiment of FIG. 8, the transmission 800 includes a first planetary gearset 806, a second planetary gearset 808, a third planetary gearset 810, and a fourth planetary gearset 812. Each planetary gearset can be referred to as a simple or compound planetary gearset. For example, in some aspects, one or more of the plurality of planetary gearsets can be formed as an idler planetary gearset. In FIG. 8, each of the plurality of gearsets is illustrated as a simple planetary gearset. One or more of the plurality of planetary gearsets can be arranged in different locations within the transmission 800, but for sake of simplicity and in this particular example only, the planetary gearsets are aligned in an axial direction consecutively in sequence (i.e., first, second, third, and fourth between the input and output shafts).

The transmission 800 may also include a plurality of torque-transmitting or gearshifting mechanisms. For example, one or more of these mechanisms can include a clutch or brake. In one aspect, each of the plurality of mechanisms is disposed within an outer housing of the transmission 800. In another aspect, however, one or more of the mechanisms may be disposed outside of the housing. Each of the plurality of mechanisms can be coupled to one or more of the plurality of planetary gearsets, which will be described further below.

In the embodiment of FIG. 8, the transmission 800 can include a first torque-transmitting mechanism 858, a second torque-transmitting mechanism 860, and a third torque-transmitting mechanism are configured to function as brakes (e.g., the torque-transmitting mechanism is fixedly coupled to the outer housing of the transmission 800). Each brake can be configured as a shiftable-friction-locked disk brake, shiftable friction-locked band brake, shiftable form-locking claw or conical brake, or any other type of known brake. The transmission 800 can also include a fourth torque-transmitting mechanism 864, a fifth torque-transmitting mechanism 866, and a sixth torque-transmitting mechanism 868 that are configured to function as clutches. These can be shiftable friction-locked multi-disk clutches, shiftable form-locking claw or conical clutches, wet clutches, or any other known form of a clutch. With these six torque-transmitting mechanisms, selective shifting of at least ten forward gears and at least one reverse gear is possible.

The transmission 800 of FIG. 8 may also include at least eight or nine different shafts, which is inclusive of the input shaft 802 and output shaft 804. Each of these shafts, designated as a first shaft 822, a second shaft 824, a third shaft 826, a fourth shaft 836, a fifth shaft 846, a sixth shaft 848, and a seventh shaft 870 and are configured to be connected to one or more of the plurality of planetary gearsets or plurality of torque-transmitting mechanism between the input shaft 802 and output shaft 804.

In FIG. 8, the first planetary gearset 806 can include a first sun gear 814, a first ring gear 816, and a first carrier member 818 that rotatably supports a set of pinion gears 820. The second planetary gearset 808 can include a second sun gear 828, a second ring gear 830, and a second carrier member 832 that rotatably supports a set of pinion gears 834. The third planetary gearset 810 can include a third sun gear 838, a third ring gear 840, and a third carrier member 842 that rotatably supports a set of pinion gears 844. The fourth planetary gearset 812 can rotatably supports a set of pinion gears 856.

The transmission 800 is capable of transferring torque from the input shaft 802 to the output shaft 804 in at least ten forward gears or ratios and at least one reverse gear or ratio. Each of the forward torque ratios and the reverse torque ratios can be attained by the selective engagement of one or more of the torque-transmitting mechanisms (i.e., torque-transmitting mechanisms 858, 860, 862, 864, 866, and 868). Those skilled in the art will readily understand that a different speed ratio is associated with each torque ratio. Thus, at least ten forward speed ratios and at least one reverse speed ratio may be attained by transmission 800.

As for the transmission 800, kinematic coupling of the first planetary gearset 806 is shown in FIG. 8. The first sun gear 814 is coupled to the input shaft 802 for common rotation therewith. The first carrier member 818 is coupled to the first shaft 822 for common rotation therewith. First ring gear 816 is coupled for common rotation with the second shaft 824. First pinion gears 820 are configured to intermesh with the first sun gear 814 and first ring gear 816.

With respect to the second planetary gearset 808, the second sun gear 828 is coupled to the second shaft 824 for common rotation therewith. The second ring gear 830 is coupled to the fourth shaft 836 for common rotation therewith. The second carrier member 832 is coupled for common rotation with the third shaft 826. Second pinion gears 834 are configured to intermesh with the second sun gear 828 and second ring gear 830.

The third sun gear 838 of the third planetary gearset 810 is coupled to the fifth shaft 846 for common rotation therewith. The third ring gear 840 is coupled to the first shaft 822 for common rotation therewith. Third pinion gears 844 are configured to intermesh with the third sun gear 838 and third ring gear 840, respectively. The third carrier member 842 is coupled for common rotation with the third shaft 826.

The kinematic relationship of the fourth planetary gearset 812 is such that the fourth sun gear 850 is coupled to the seventh shaft 870 for common rotation therewith. The fourth ring gear 852 is coupled to the fourth shaft 836 for common rotation therewith. The fourth pinion gears 856 are configured to intermesh with the fourth sun gear 850 and the fourth ring gear 852. The fourth carrier member 854 is coupled to the output shaft 804 for common rotation therewith.

With regards to the kinematic coupling of the six torque-transmitting mechanisms to the previously described shafts, the multiple speed transmission 800 of FIG. 8 provides that the first torque-transmitting mechanism 858 is arranged within the power flow between the first shaft 822 and the housing G of the transmission 800. In this manner, the first torque-transmitting mechanism 858 is configured to act as a brake. The second torque-transmitting mechanism 860 is arranged within the power flow between the third shaft 826 and the housing G of the transmission 800. The third torque-transmitting mechanism 862 is arranged within the power flow between the second shaft 824 and the housing G of the transmission 800. The fourth torque-transmitting mechanism 864 is arranged within the power flow between the input shaft 802 and the third shaft 826. The fifth torque-transmitting mechanism 866 is arranged within the power flow between the input shaft 802 and the seventh shaft 870. The sixth torque-transmitting mechanism 868 is arranged within the power flow between the input shaft 802 and the fifth shaft 846.

The kinematic couplings of the embodiment in FIG. 8 can further be described with respect to the selective engagement of the torque-transmitting mechanisms with respect to one or more components of the plurality of planetary gearsets. For example, in the transmission 800, the first torque-transmitting mechanism 858 is selectively engageable to couple the first carrier member 818, the third ring gear 840, and the first shaft 822 to the housing G of the transmission 800. The second torque-transmitting mechanism 860 is selectively engageable to couple the second carrier member 832, the third carrier member 842, and the third shaft 826 to the housing G of the transmission 800. Moreover, the third torque-transmitting mechanism 862 is selectively engageable to couple the first ring gear 816, the second sun gear 828, and the second shaft 824 to the housing G of the transmission 800. The fourth torque-transmitting mechanism 864 is selectively engageable to couple the first sun gear 814 and the input shaft 802 to the second carrier member 832, the third carrier member 842, and the third shaft 826. The fifth torque-transmitting mechanism 866 is selectively engageable to couple the first sun gear 814 and the input shaft 802 to the fourth sun gear 850 and the seventh shaft 870. Lastly, the sixth torque-transmitting mechanism 868 is selectively engageable to couple the first sun gear 814 and the input shaft 802 to the third sun gear 838 and the fifth shaft 846.

In the example of FIG. 9, a first reverse ratio (R1) can be achieved by the selective engagement of the torque-transmitting mechanisms as set forth in the table. As shown, the second torque-transmitting mechanism (C2), the third torque-transmitting mechanism (C3) and the sixth torque-transmitting mechanism (C6) are selectively engaged to establish the reverse ratio. Thus, in transmission 800 of FIG. 8, the selective engagement of mechanisms 260, 262 and 268 can establish the reverse ratio. Other reverse ratios are also possible by the selective engagement of torque-transmitting mechanisms other than those shown in FIG. 9. Moreover, while not shown in FIG. 9, the transmission may also shift into a neutral range or gear ratio, where none of the torque-transmitting mechanisms carry torque. One or more of the torque-transmitting mechanisms, however, may be engaged in neutral but not carry torque.

A first forward ratio (i.e., Range 1) in the table of FIG. 9 is achieved by engaging two brakes and one of the clutches. In FIG. 8, for example, the second torque-transmitting mechanism 660, the third torque-transmitting mechanism 662, and the fifth torque-transmitting mechanism 666 are engaged. In one embodiment, when transitioning between neutral and the first forward range, two of the second, third and fifth torque-transmitting mechanisms may already be at least partially engaged, whereas the unapplied torque-transmitting mechanism of the three shown in FIG. 9 is selectively engaged to achieve the first forward ratio.

In a second or subsequent forward ratio, indicated as Range 2 in FIG. 9, the first torque-transmitting mechanism, the second torque-transmitting mechanism, and the fifth torque-transmitting mechanism are selectively engaged. Therefore, when transitioning between the first forward ratio and the second forward ratio, the third torque-transmitting mechanism is released and the first torque-transmitting mechanism is engaged.

In a third or subsequent forward ratio, indicated as Range 3 in FIG. 9, the second, fifth, and sixth torque-transmitting mechanisms are engaged. To transition from the second forward ratio to the third forward ratio, for example, the first torque-transmitting mechanism is released and the sixth torque-transmitting mechanism is engaged.

In a fourth or the next subsequent forward ratio, indicated as Range 4 in FIG. 9, the first torque-transmitting mechanism, the fifth torque-transmitting mechanism, and sixth torque-transmitting mechanism are engaged. Thus, to transition from the third forward ratio and upshift to the fourth forward ratio, the second torque-transmitting mechanism is released and the first torque-transmitting mechanism is engaged.

In a fifth or the next subsequent forward ratio, indicated as Range 5 in FIG. 9, the third torque-transmitting mechanism, the fifth torque-transmitting mechanism, and sixth torque-transmitting mechanism are engaged. Thus, to transition from the fourth forward ratio and upshift to the fifth forward ratio, the first torque-transmitting mechanism is released and the third torque-transmitting mechanism is engaged.

In a sixth or the next subsequent forward ratio, indicated as Range 6 in FIG. 9, the fourth torque-transmitting mechanism, the fifth torque-transmitting mechanism, and sixth torque-transmitting mechanism are engaged. Thus, to transition from the fifth forward ratio and upshift to the sixth forward ratio, the third torque-transmitting mechanism is released and the fourth torque-transmitting mechanism is engaged.

In a seventh or the next subsequent forward ratio, indicated as Range 7 in FIG. 9, the third torque-transmitting mechanism, the fourth torque-transmitting mechanism, and fifth torque-transmitting mechanism are engaged. Thus, to transition from the sixth forward ratio and upshift to the seventh forward ratio, the sixth torque-transmitting mechanism is released and the third torque-transmitting mechanism is engaged.

In an eighth or the next subsequent forward ratio, indicated as Range 8 in FIG. 9, the first torque-transmitting mechanism, fourth torque-transmitting mechanism, and fifth torque-transmitting mechanism are engaged. Thus, to transition from the seventh forward ratio and upshift to the eighth forward ratio, the third torque-transmitting mechanism is released and the first torque-transmitting mechanism is engaged.

In a ninth or the next subsequent forward ratio, indicated as Range 9 in FIG. 9, the third torque-transmitting mechanism, fourth torque-transmitting mechanism, and sixth torque-transmitting mechanism are engaged. Thus, to transition from the eighth forward ratio and upshift to the ninth forward ratio, the first torque-transmitting mechanism is released and the third torque-transmitting mechanism is engaged.

In a tenth or the next subsequent forward ratio, indicated as Range 10 in FIG. 9, the first torque-transmitting mechanism, the fourth torque-transmitting mechanism, and sixth torque-transmitting mechanism are engaged. Thus, to transition from the ninth forward ratio and upshift to the tenth forward ratio, the third torque-transmitting mechanism is released and the first torque-transmitting mechanism is engaged.

Although not shown in FIG. 9, but as discussed herein, the output shaft of the transmission can be selectively locked from rotating in a condition known as hill hold. The hill hold condition can be achieved by selecting engaging three of the six torque-transmitting mechanisms of the transmission 800 in FIG. 8.

The present disclosure further contemplates that downshifts follow the reverse sequence of the corresponding upshift (as described above), and several power-on skip-shifts that are single-transition are possible (e.g. from 1st to 3rd or 3rd to 1st).

Figure 10:
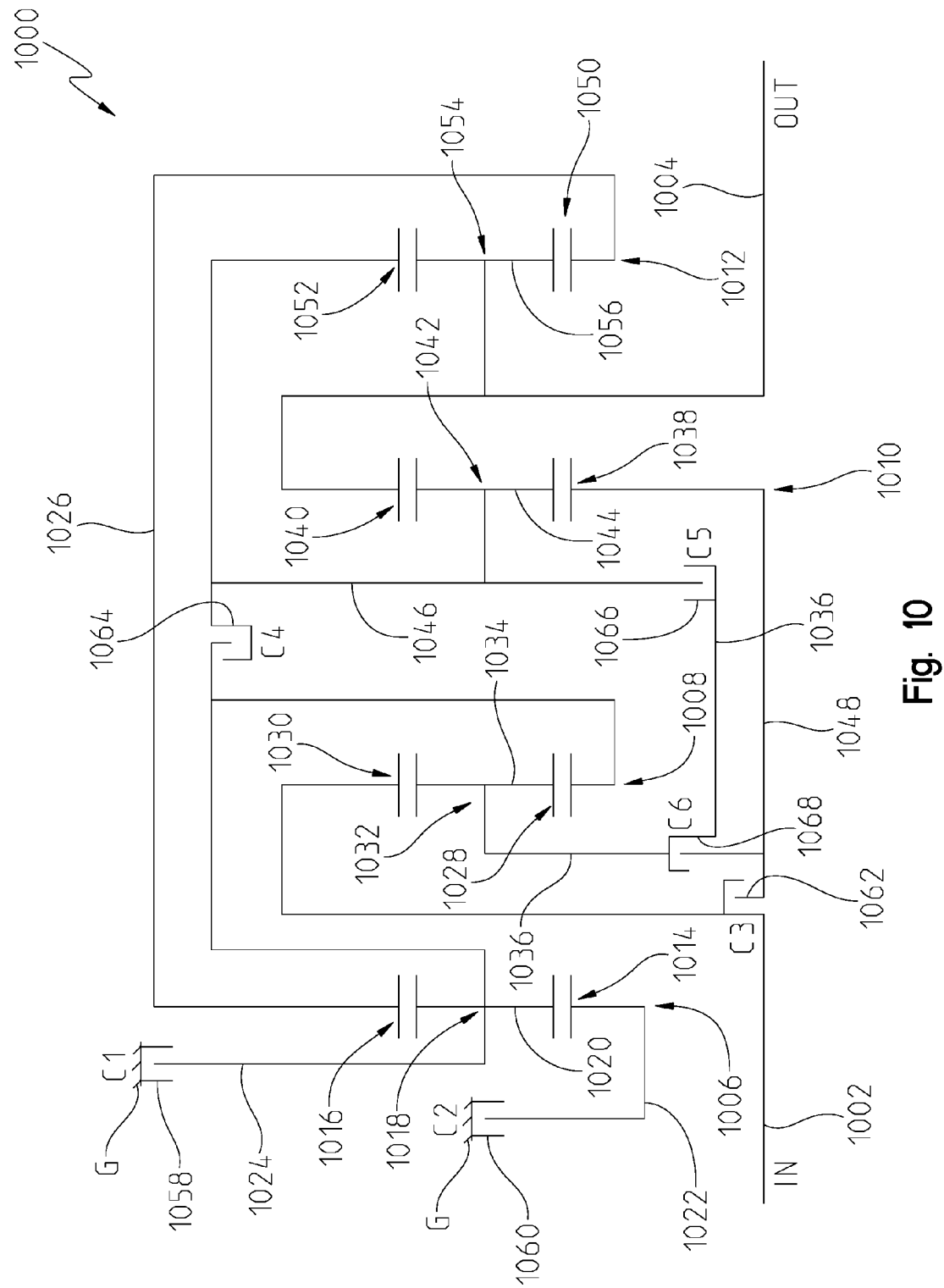
FIG. 10 is a diagrammatic view of an embodiment of a multiple speed transmission.

Referring to FIG. 10, a schematic representation or stick diagram illustrates one embodiment of a multi-speed transmission 1000 according to the present disclosure. The transmission 1000 includes an input shaft 1002 and an output shaft 1004. The input shaft 1002 and output shaft 1004 can be disposed along the same axis or centerline of the transmission 1000. In another aspect, the different shafts can be disposed along different axes or centerlines. In a further aspect, the different shafts can be disposed parallel to one another, but along different axes or centerlines. Other aspects can be appreciated by one skilled in the art.

The transmission 1000 can also include a plurality of planetary gearsets. In the illustrated embodiment of FIG. 10, the transmission 1000 includes a first planetary gearset 1006, a second planetary gearset 1008, a third planetary gearset 1010, and a fourth planetary gearset 10102. Each planetary gearset can be referred to as a simple or compound planetary gearset. For example, in some aspects, one or more of the plurality of planetary gearsets can be formed as an idler planetary gearset. In FIG. 10, each of the plurality of gearsets is illustrated as a simple planetary gearset. One or more of the plurality of planetary gearsets can be arranged in different locations within the transmission 1000, but for sake of simplicity and in this particular example only, the planetary gearsets are aligned in an axial direction consecutively in sequence (i.e., first, second, third, and fourth between the input and output shafts).

The transmission 1000 may also include a plurality of torque-transmitting or gearshifting mechanisms. For example, one or more of these mechanisms can include a clutch or brake. In one aspect, each of the plurality of mechanisms is disposed within an outer housing of the transmission 1000. In another aspect, however, one or more of the mechanisms may be disposed outside of the housing. Each of the plurality of mechanisms can be coupled to one or more of the plurality of planetary gearsets, which will be described further below.

In the embodiment of FIG. 10, the transmission 1000 can include a first torque-transmitting mechanism 1058 and a second torque-transmitting mechanism 1060 are configured to function as brakes (e.g., the torque-transmitting mechanism is fixedly coupled to the outer housing of the transmission 1000). Each brake can be configured as a shiftable-friction-locked disk brake, shiftable friction-locked band brake, shiftable form-locking claw or conical brake, or any other type of known brake. The transmission 1000 can also include a third torque-transmitting mechanism 1062, a fourth torque-transmitting mechanism 1064, a fifth torque-transmitting mechanism 1066, and a sixth torque-transmitting mechanism 1068 that are configured to function as clutches. These can be shiftable friction-locked multi-disk clutches, shiftable form-locking claw or conical clutches, wet clutches, or any other known form of a clutch. With these six torque-transmitting mechanisms, selective shifting of at least ten forward gears and at least one reverse gear is possible.

The transmission 1000 of FIG. 10 may also include at least eight or nine different shafts, which is inclusive of the input shaft 1002 and output shaft 1004. Each of these shafts, designated as a first shaft 1022, a second shaft 1024, a third shaft 1026, a fourth shaft 1036, a fifth shaft 1046, and a sixth shaft 1048 are configured to be connected to one or more of the plurality of planetary gearsets or plurality of torque-transmitting mechanism between the input shaft 1002 and output shaft 1004.

In FIG. 10, the first planetary gearset 1006 can include a first sun gear 1014, a first ring gear 1016, and a first carrier member 1018 that rotatably supports a set of pinion gears 1020. The second planetary gearset 1008 can include a second sun gear 1028, a second ring gear 1030, and a second carrier member 1032 that rotatably supports a set of pinion gears 1034. The third planetary gearset 1010 can include a third sun gear 1038, a third ring gear 1040, and a third carrier member 1042 that rotatably supports a set of pinion gears 1044. The fourth planetary gearset 10102 can rotatably supports a set of pinion gears 1056.

The transmission 1000 is capable of transferring torque from the input shaft 1002 to the output shaft 1004 in at least ten forward gears or ratios and at least one reverse gear or ratio. Each of the forward torque ratios and the reverse torque ratios can be attained by the selective engagement of one or more of the torque-transmitting mechanisms (i.e., torque-transmitting mechanisms 1058, 1060, 1062, 1064, 1066, and 1068). Those skilled in the art will readily understand that a different speed ratio is associated with each torque ratio. Thus, at least ten forward speed ratios and at least one reverse speed ratio may be attained by transmission 1000.

As for the transmission 1000, kinematic coupling of the first planetary gearset 1006 is shown in FIG. 10. The first sun gear 1014 is coupled to the first shaft 1022 for common rotation therewith. The first carrier member 1018 is coupled to the second shaft 1024 for common rotation therewith. First ring gear 1016 is coupled for common rotation with the third shaft 1026. First pinion gears 1020 are configured to intermesh with the first sun gear 1014 and first ring gear 1016.

With respect to the second planetary gearset 1008, the second sun gear 1028 is coupled to the second shaft 1024 for common rotation therewith. The second ring gear 1030 is coupled to the input shaft 1002 for common rotation therewith. The second carrier member 1032 is coupled for common rotation with the fourth shaft 1036. Second pinion gears 1034 are configured to intermesh with the second sun gear 1028 and second ring gear 1030.

The third sun gear 1038 of the third planetary gearset 1010 is coupled to the sixth shaft 1048 for common rotation therewith. The third ring gear 1040 is coupled to the output shaft 1004 for common rotation therewith. Third pinion gears 1044 are configured to intermesh with the third sun gear 1038 and third ring gear 1040, respectively. The third carrier member 1042 is coupled for common rotation with the fifth shaft 1046.

The kinematic relationship of the fourth planetary gearset 10102 is such that the fourth sun gear 1050 is coupled to the third shaft 1026 for common rotation therewith. The fourth ring gear 1052 is coupled to the fifth shaft 1046 for common rotation therewith. The fourth pinion gears 1056 are configured to intermesh with the fourth sun gear 1050 and the fourth ring gear 1052. The fourth carrier member 1054 is coupled to the output shaft 1004 for common rotation therewith.

With regards to the kinematic coupling of the six torque-transmitting mechanisms to the previously described shafts, the multiple speed transmission 1000 of FIG. 10 provides that the first torque-transmitting mechanism 1058 is arranged within the power flow between the first shaft 1022 and the housing G of the transmission 1000. In this manner, the first torque-transmitting mechanism 1058 is configured to act as a brake. The second torque-transmitting mechanism 1060 is arranged within the power flow between the first shaft 1022 and the housing G of the transmission 1000. The third torque-transmitting mechanism 1062 is arranged within the power flow between the input shaft 1002 and the sixth shaft 1048. The fourth torque-transmitting mechanism 1064 is arranged within the power flow between the second shaft 1024 and the fifth shaft 1046. The fifth torque-transmitting mechanism 1066 is arranged within the power flow between the fourth shaft 1036 and the fifth shaft 1046. The sixth torque-transmitting mechanism 1068 is arranged within the power flow between the fourth shaft 1036 and the sixth shaft 1048.

The kinematic couplings of the embodiment in FIG. 10 can further be described with respect to the selective engagement of the torque-transmitting mechanisms with respect to one or more components of the plurality of planetary gearsets. For example, in the transmission 1000, the first torque-transmitting mechanism 1058 is selectively engageable to couple the first carrier member 1018, the second sun gear 1028, and the second shaft 1024 to the housing G of the transmission 1000. The second torque-transmitting mechanism 1060 is selectively engageable to couple the first sun gear 1014 and the first shaft 1022 to the housing G of the transmission 1000. Moreover, the third torque-transmitting mechanism 1062 is selectively engageable to couple the second ring gear 1030 and the input shaft 1002 to the third sun gear 1038 and the sixth shaft 1048. The fourth torque-transmitting mechanism 1064 is selectively engageable to couple the first carrier member 1018, the second sun gear 1028, and the second shaft 1024 to the third carrier member 1042, the fourth ring gear 1052, and the fifth shaft 1046. The fifth torque-transmitting mechanism 1066 is selectively engageable to couple the second carrier member 1032 and the fourth shaft 1036 to the third carrier member 1042, the fourth ring gear 1052, and the fifth shaft 1046. Lastly, the sixth torque-transmitting mechanism 1068 is selectively engageable to couple the second carrier member 1032 and the fourth shaft 1036 to the third sun gear 1038 and the sixth shaft 1048.

In the example of FIG. 11, a first reverse ratio (R1) can be achieved by the selective engagement of the torque-transmitting mechanisms as set forth in the table. As shown, the first torque-transmitting mechanism (C1), the fourth torque-transmitting mechanism (C4) and the sixth torque-transmitting mechanism (C6) are selectively engaged to establish the reverse ratio (R1). Thus, in transmission 1000 of FIG. 10, the selective engagement of mechanisms 258, 264 and 268 can establish the reverse ratio. Other reverse ratios are also possible by the selective engagement of torque-transmitting mechanisms other than those shown in FIG. 11. For instance, a second reverse ratio (R2) may be achieved by the selective engagement of the first, third, and fourth torque-transmitting mechanisms of the transmission 1000 in FIG. 10. The gear ratio of the second reverse ratio may be different from the first reverse ratio and provide advantages not possible in the first reverse ratio. Moreover, while not shown in FIG. 11, the transmission may also shift into a neutral range or gear ratio, where none of the torque-transmitting mechanisms carry torque. One or more of the torque-transmitting mechanisms, however, may be engaged in neutral but not carry torque.

A first forward ratio (i.e., Range 1) in the table of FIG. 11 is achieved by engaging three of the torque-transmitting mechanisms of FIG. 10. In FIG. 10, for example, the first torque-transmitting mechanism 658, the second torque-transmitting mechanism 660, and the sixth torque-transmitting mechanism 668 are engaged. In one embodiment, when transitioning between neutral and the first forward range, two of the first, second and sixth torque-transmitting mechanisms may already be at least partially engaged, whereas the unapplied torque-transmitting mechanism of the three shown in FIG. 11 is selectively engaged to achieve the first forward ratio.

In a second or subsequent forward ratio, indicated as Range 2 in FIG. 11, the first torque-transmitting mechanism, the second torque-transmitting mechanism, and the third torque-transmitting mechanism are selectively engaged. Therefore, when transitioning between the first forward ratio and the second forward ratio, the sixth torque-transmitting mechanism is released and the third torque-transmitting mechanism is engaged.

In a third or subsequent forward ratio, indicated as Range 3 in FIG. 11, the first, second, and fifth torque-transmitting mechanisms are engaged. To transition from the second forward ratio to the third forward ratio, for example, the third torque-transmitting mechanism is released and the fifth torque-transmitting mechanism is engaged.

In a fourth or the next subsequent forward ratio, indicated as Range 4 in FIG. 11, the first torque-transmitting mechanism, the third torque-transmitting mechanism, and fifth torque-transmitting mechanism are engaged. Thus, to transition from the third forward ratio and upshift to the fourth forward ratio, the second torque-transmitting mechanism is released and the third torque-transmitting mechanism is engaged.

In a fifth or the next subsequent forward ratio, indicated as Range 5 in FIG. 11, the first torque-transmitting mechanism, the fifth torque-transmitting mechanism, and sixth torque-transmitting mechanism are engaged. Thus, to transition from the fourth forward ratio and upshift to the fifth forward ratio, the third torque-transmitting mechanism is released and the sixth torque-transmitting mechanism is engaged.

In a sixth or the next subsequent forward ratio, indicated as Range 6 in FIG. 11, the second torque-transmitting mechanism, the fifth torque-transmitting mechanism, and sixth torque-transmitting mechanism are engaged. Thus, to transition from the fifth forward ratio and upshift to the sixth forward ratio, the first torque-transmitting mechanism is released and the second torque-transmitting mechanism is engaged.

In a seventh or the next subsequent forward ratio, indicated as Range 7 in FIG. 11, the third torque-transmitting mechanism, the fifth torque-transmitting mechanism, and sixth torque-transmitting mechanism are engaged. Thus, to transition from the sixth forward ratio and upshift to the seventh forward ratio, the second torque-transmitting mechanism is released and the third torque-transmitting mechanism is engaged.

In an eighth or the next subsequent forward ratio, indicated as Range 8 in FIG. 11, the second torque-transmitting mechanism, third torque-transmitting mechanism, and sixth torque-transmitting mechanism are engaged. Thus, to transition from the seventh forward ratio and upshift to the eighth forward ratio, the fifth torque-transmitting mechanism is released and the second torque-transmitting mechanism is engaged.

In a ninth or the next subsequent forward ratio, indicated as Range 9 in FIG. 11, the second torque-transmitting mechanism, third torque-transmitting mechanism, and fourth torque-transmitting mechanism are engaged. Thus, to transition from the eighth forward ratio and upshift to the ninth forward ratio, the sixth torque-transmitting mechanism is released and the fourth torque-transmitting mechanism is engaged.

In a tenth or the next subsequent forward ratio, indicated as Range 10 in FIG. 11, the second torque-transmitting mechanism, the fourth torque-transmitting mechanism, and sixth torque-transmitting mechanism are engaged. Thus, to transition from the ninth forward ratio and upshift to the tenth forward ratio, the third torque-transmitting mechanism is released and the sixth torque-transmitting mechanism is engaged.

As also shown in FIG. 11, the output shaft of the transmission can be selectively locked from rotating in a hill hold condition. The hill hold condition can be achieved by selecting engaging three of the six torque-transmitting mechanisms of the transmission 800 in FIG. 10. In FIG. 11, hill hold is achieved by selectively engaging the first, second, and fourth torque-transmitting mechanisms.

The present disclosure further contemplates that downshifts follow the reverse sequence of the corresponding upshift (as described above), and several power-on skipshifts that are single-transition are possible (e.g. from 1st to 3rd or 3rd to 1st).

While exemplary embodiments incorporating the principles of the present disclosure have been disclosed herein-above, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A multiple speed transmission, comprising:
an input member;
an output member;
first, second, third and fourth planetary gearsets each having first, second and third members;
a plurality of interconnecting members each connected to at least one of the first, second, third, and fourth planetary gearsets;
a first torque-transmitting mechanism selectively engageable to interconnect the second member of the third planetary gearset with a stationary member;
a second torque-transmitting mechanism selectively engageable to interconnect the third member of the first planetary gearset and the first member of the third planetary gearset with the stationary member;
a third torque-transmitting mechanism selectively engageable to interconnect the second member of the second planetary gearset with the input member;
a fourth torque-transmitting mechanism selectively engageable to interconnect the first member of the second planetary gearset and the first member of the fourth planetary gearset with the input member;
a fifth torque-transmitting mechanism selectively engageable to interconnect the second member of the second planetary gearset with the third member of the third planetary gearset and the third member of the fourth planetary gearset;
a sixth torque-transmitting mechanism selectively engageable to interconnect the second member of the second planetary gearset with the second member of the third planetary gearset;
wherein the torque transmitting mechanisms are selectively engageable in combinations of at least three to establish at least ten forward speed ratios and at least one reverse speed ratio between the input member and the output member.

2. The multiple speed transmission of claim 1, wherein the input member is not continuously interconnected with any member of the first, second, third, or fourth planetary gearset, and the output member is continuously interconnected with the second member of the fourth planetary gearset.

3. The multiple speed transmission of claim 1, wherein the plurality of interconnecting members includes a first interconnecting member directly connecting the first member of the first planetary gearset with the stationary member.

4. The multiple speed transmission of claim 1, wherein the plurality of interconnecting members includes a second interconnecting member continuously interconnecting the second member of the first planetary gearset with the third member of the second planetary gearset.

5. The multiple speed transmission of claim 1, wherein the plurality of interconnecting members includes a third interconnecting member continuously interconnecting the third member of the first planetary gearset with the first member of the third planetary gearset.

6. The multiple speed transmission of claim 1, wherein the plurality of interconnecting members includes a fourth interconnecting member continuously connected to the second member of the second planetary gearset.

7. The multiple speed transmission of claim 1, wherein the plurality of interconnecting members includes a fifth interconnecting member continuously interconnecting the first member of the second planetary gearset with the first member of the fourth planetary gearset.

8. The multiple speed transmission of claim 1, wherein the plurality of interconnecting members includes a sixth interconnecting member continuously interconnecting the third member of the third planetary gearset with the third member of the fourth planetary gearset.

9. The multiple speed transmission of claim 1, wherein the plurality of interconnecting members includes a seventh interconnecting member continuously connected to the second member of the third planetary gearset.

10. The multiple speed transmission of claim 1, wherein when shifting from at least one forward speed ratio into one of a successive higher and a successive lower forward speed ratio causes at least two of the first, the second, the third, the fourth, the fifth and the sixth torque transmitting mechanisms to disengage and at least two of the first, the second, the third, the fourth, the fifth, and the sixth torque transmitting mechanisms to engage.

11. The multiple speed transmission of claim 1, wherein when shifting from one forward speed ratio into one of a successive higher and a successive lower forward speed ratio causes at least one of the first, the second, the third, the fourth, the fifth and the sixth torque transmitting mechanisms to disengage and at least one of the first, the second, the third, the fourth, the fifth, and the sixth torque transmitting mechanisms to engage.

12. The multiple speed transmission of claim 1, wherein a hill hold condition is achieved when the first, second and sixth torque-transmitting mechanisms are selectively engaged.

13. A multiple speed transmission, comprising:
an input member;
an output member;
first, second, third and fourth planetary gearsets each having a sun gear, a carrier member, and a ring gear;
a plurality of interconnecting members each connected to at least one of the first, second, third, and fourth planetary gearsets;
a first torque-transmitting mechanism selectively engageable to interconnect the carrier member of the third planetary gearset with a stationary member;
a second torque-transmitting mechanism selectively engageable to interconnect the ring gear of the first planetary gearset and the sun gear of the third planetary gearset with the stationary member;
a third torque-transmitting mechanism selectively engageable to interconnect the carrier member of the second planetary gearset with the input member;
a fourth torque-transmitting mechanism selectively engageable to interconnect the sun gear of the second planetary gearset and the sun gear of the fourth planetary gearset with the input member;
a fifth torque-transmitting mechanism selectively engageable to interconnect the carrier member of the second planetary gearset with the ring gear of the third planetary gearset and the ring gear of the fourth planetary gearset;
a sixth torque-transmitting mechanism selectively engageable to interconnect the carrier member of the second planetary gearset with the carrier member of the third planetary gearset;

wherein the torque transmitting mechanisms are selectively engageable in combinations of at least three to establish at least ten forward speed ratios and at least one reverse speed ratio between the input member and the output member.

14. The multiple speed transmission of claim 13, wherein the plurality of interconnecting members includes a first interconnecting member directly connecting the sun gear of the first planetary gearset with the stationary member.

15. The multiple speed transmission of claim 13, wherein the plurality of interconnecting members includes a second interconnecting member continuously interconnecting the carrier member of the first planetary gearset with the ring gear of the second planetary gearset.

16. The multiple speed transmission of claim 13, wherein the plurality of interconnecting members includes a third interconnecting member continuously interconnecting the ring gear of the first planetary gearset with the sun gear of the third planetary gearset.

17. The multiple speed transmission of claim 13, wherein the plurality of interconnecting members includes a fourth interconnecting member continuously connected to the carrier member of the second planetary gearset.

18. The multiple speed transmission of claim 13, wherein the plurality of interconnecting members includes a fifth interconnecting member continuously interconnecting the sun gear of the second planetary gearset with the sun gear of the fourth planetary gearset.

19. The multiple speed transmission of claim 13, wherein the plurality of interconnecting members includes a sixth interconnecting member continuously interconnecting the ring gear of the third planetary gearset with the ring gear of the fourth planetary gearset.

20. The multiple speed transmission of claim 13, wherein the plurality of interconnecting members includes a seventh interconnecting member continuously connected to the carrier member of the third planetary gearset.

* * * * *